US010543766B2

(12) United States Patent
Okuma et al.

(10) Patent No.: US 10,543,766 B2
(45) Date of Patent: Jan. 28, 2020

(54) SKELETAL STRUCTURE

(71) Applicant: TS TECH CO., LTD., Asaki-shi, Saitama (JP)

(72) Inventors: Kei Okuma, Shioya-gun (JP); Kazunari Nishide, Shioya-gun (JP); Hidetaka Yonehara, Shioya-gun (JP); Yu Sugiyama, Shioya-gun (JP); Yusuke Takahashi, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 15/771,959

(22) PCT Filed: Oct. 21, 2016

(86) PCT No.: PCT/JP2016/081269
§ 371 (c)(1),
(2) Date: Apr. 27, 2018

(87) PCT Pub. No.: WO2017/073484
PCT Pub. Date: May 4, 2017

(65) Prior Publication Data
US 2019/0084457 A1 Mar. 21, 2019

(30) Foreign Application Priority Data

Oct. 29, 2015 (JP) ................. 2015-212534
Oct. 29, 2015 (JP) ................. 2015-212537
Oct. 29, 2015 (JP) ................. 2015-212538

(51) Int. Cl.
B60N 2/42 (2006.01)
B60N 2/90 (2018.01)
(Continued)

(52) U.S. Cl.
CPC ............. B60N 2/686 (2013.01); B60N 2/427 (2013.01); B60N 2/90 (2018.02)

(58) Field of Classification Search
CPC .......... B60N 2/427; B60N 2/68; B60N 2/686; B60N 2/90
(Continued)

(56) References Cited

U.S. PATENT DOCUMENTS 5,464,273 A * 11/1995 Makoto ................. B60N 2/242
297/232
6,296,291 B1 * 10/2001 Lansinger ............ B60N 2/4249
296/65.16
(Continued)

FOREIGN PATENT DOCUMENTS

CN 101142106 A 3/2008
CN 100572138 C 12/2009
(Continued)

OTHER PUBLICATIONS

Jan. 24, 2017 International Search Report issued in International Patent Application No. PCT/JP2016/81269.
(Continued)

Primary Examiner — Rodney B White
(74) Attorney, Agent, or Firm — Oliff PLC

(57) ABSTRACT

A skeletal structure including: a panel; and a frame which is joined to a front surface side of the panel, wherein the frame includes a plurality of first frames oriented in a fixed direction and a second frame oriented in a direction orthogonal to the first frame, the first frame and the second frame are formed to have an open cross-sectional shape, each of the first frame and the second frame includes an opposing wall facing the panel and a pair of side walls rising from both side portions of the opposing wall toward the panel, the plurality of first frames includes joint portions and non-joint portions to the panel along a longitudinal direction of the first frames, and the non-joint portions of all the first frames are arranged (Continued)

at positions matching or overlapping with each other with respect to the longitudinal direction of the first frames.

20 Claims, 12 Drawing Sheets

(51) Int. Cl.
    *B60N 2/68*     (2006.01)
    *B60N 2/427*     (2006.01)

(58) Field of Classification Search
    USPC .................................. 297/452.14, 452.15
    See application file for complete search history.

(56) References Cited

U.S. PATENT DOCUMENTS

| | | | | |
|---|---|---|---|---|
| 6,347,836 | B1* | 2/2002 | Hayotte | B60N 2/20 297/378.1 |
| 7,243,998 | B2* | 7/2007 | Fourrey | B29C 45/14631 297/452.15 X |
| 8,998,316 | B2* | 4/2015 | Naughton | B60N 2/686 297/452.14 X |
| 2003/0160482 | A1* | 8/2003 | Yanai | B60N 2/3013 297/216.13 |
| 2004/0155511 | A1* | 8/2004 | Garnweidner | B60N 2/5825 297/452.18 |
| 2005/0023880 | A1* | 2/2005 | Fourrey | B29C 45/14631 297/452.18 |
| 2007/0278842 | A1* | 12/2007 | Ikai | B60N 2/682 297/452.14 |
| 2008/0084105 | A1* | 4/2008 | Behrens | B60N 2/5816 297/452.55 |
| 2008/0252131 | A1* | 10/2008 | Warnken | B60N 2/5825 297/452.18 |
| 2010/0109415 | A1* | 5/2010 | Roszczenko | B60N 2/22 297/452.18 |
| 2011/0025115 | A1* | 2/2011 | Tanaka | B60N 2/36 297/391 |
| 2011/0127823 | A1* | 6/2011 | Behrens | B60N 2/686 297/452.55 |
| 2011/0140480 | A1* | 6/2011 | Nakamura | B60N 2/3013 296/187.05 |
| 2011/0148172 | A1* | 6/2011 | Eckenroth | B60N 2/682 297/452.1 |
| 2011/0148174 | A1* | 6/2011 | Eckenroth | B60N 2/682 297/452.18 |
| 2011/0278900 | A1* | 11/2011 | Zekavica | B60N 2/68 297/452.2 |
| 2012/0181839 | A1* | 7/2012 | Michalak | B60N 2/686 297/452.1 |
| 2012/0187738 | A1* | 7/2012 | Gross | B21D 26/14 297/452.1 |
| 2012/0200137 | A1* | 8/2012 | Tosco | B23K 37/04 297/452.48 |
| 2012/0261956 | A1* | 10/2012 | Nasshan | B60N 2/366 297/232 |
| 2012/0319449 | A1* | 12/2012 | Schenten | B60N 2/2245 297/452.18 |
| 2013/0015694 | A1* | 1/2013 | Tosco | B60N 2/682 297/452.18 |
| 2017/0267128 | A1* | 9/2017 | Tomita | B60N 2/206 |
| 2017/0313223 | A1* | 11/2017 | Tomita | B60N 2/809 |
| 2017/0368975 | A1* | 12/2017 | Miyawaki | B60N 2/682 |

FOREIGN PATENT DOCUMENTS

| | | |
|---|---|---|
| DE | 10 2008 055 103 A1 | 7/2010 |
| JP | 2006-212441 A | 8/2006 |
| JP | 2011-246067 A | 12/2011 |
| JP | 2011-251299 A | 12/2011 |
| JP | 4859195 B2 | 1/2012 |
| JP | 5526718 B2 | 6/2014 |
| JP | 5526719 B2 | 6/2014 |
| JP | 5544837 B2 | 7/2014 |
| WO | 01/89875 A1 | 11/2001 |

OTHER PUBLICATIONS

May 1, 2018 International Preliminary Report on Patentability issued in International Patent Application No. PCT/JP2016/081269.
Feb. 5, 2019 Office Action issued in Japanese Patent Application No. 2017-547771.
Oct. 14, 2019 Office Action issued in Chinese Patent Application No. 201680062489.2.

* cited by examiner

SKELETAL STRUCTURE

TECHNICAL FIELD

The present invention relates to a skeletal structure including a panel and a frame.

BACKGROUND ART

Each of Patent Literatures 1 to 4 discloses a skeletal structure used in a backrest of a rear seat of a vehicle seat.

Each of these skeletal structures includes a panel formed of a substantially rectangular metal plate and a frame joined and mounted on the panel. The frame is formed of a pipe material provided along an outer edge of the panel.

The region without the frame on the panel of the skeletal structure includes a plurality of beads formed of metal plate bulging into ridge shapes and is reinforced by the beads.

PRIOR ART DOCUMENT

Patent Documents

Patent Literature 1: Japanese Patent No. 4859195
Patent Literature 2: Japanese Patent No. 5526718
Patent Literature 3: Japanese Patent No. 5526719
Patent Literature 4: Japanese Patent No. 5544837

DISCLOSURE OF THE INVENTION

Problems to be Solved by the Invention

It is desirable that the skeletal structure with a panel has high rigidity to suppress deformation even in a case where an object collides against the panel. It would be difficult, however, to achieve high rigidity by increasing the plate thickness because of demands for a weight reduction in the skeletal structure.

For this reason, recently there has been proposed a skeletal structure designed on the presupposition that deformation of the panel is generated at the time of collision against an object and capable of absorbing collision energy by deformation so as to reduce destruction of the skeletal structure as much as possible.

In a case, however, where the central portion of the panel is deformed by collision against an object in the skeletal structure using panels such as the skeletal structures described in Patent Literatures 1 to 4, the deformation amount might be maximized to cause breakage in some cases.

This needs countermeasures such as suppression of deformation in a zone having possibility of receiving large-scale destruction, or deliberately deforming the zone unlikely to develop large-scale destruction. However, consideration for such countermeasures is not found in the skeletal structures described in Patent Literatures 1 to 4.

Therefore, it is an object of the present invention to enable controlling deformation of the skeletal structure.

In addition, conventionally used round pipe materials for the frame had a problem of difficulty in securing sufficient contact area in joining frames with each other due to their original shapes. This led to a possibility of insufficient joining strength in welding, or the like.

Moreover, due to the difficulty in securing sufficient contact area, there is a need to perform welding or the like using welding material that fills a gap for joining, leading to limitation in implementing a joining method.

Therefore, another object of the present invention is to enhance the joining strength of the frame of the skeletal structure.

Meanwhile, reinforcement is conventionally performed by forming an irregular structure formed with a plurality of beads on a panel. However, sufficient strength could not be ensured merely by forming the beads.

For example, application of the skeletal structure to the structure of a backrest of a rear seat includes a case where the backrest of the rear seat is folded forward so as to accommodate a load mounted thereon. In such a case, the conventional skeletal structure sometimes remains in a deflected state with stress. Returning the backrest to its original posture after removing the baggage would then cause the skeletal structure released from the load of the baggage to recover from the deformed state to generate a large abnormal noise in some cases.

In view of the above, another object of the present invention is to enhance the strength of the skeletal structure.

Means for Solving the Problem

In order to achieve the above object, the invention according to claim 1 is characterized in a skeletal structure including: a panel; and a frame which is joined to a front surface side of the panel, wherein the frame includes a plurality of first frames oriented in a fixed direction and a second frame oriented in a direction orthogonal to the first frame, the first frame and the second frame are formed to have an open cross-sectional shape, each of the first frame and the second frame includes an opposing wall facing the panel and a pair of side walls rising from both side portions of the opposing wall toward the panel, the plurality of first frames includes joint portions and non-joint portions to the panel along a longitudinal direction of the first frames, and the non-joint portions of all the first frames are arranged at positions matching or overlapping with each other with respect to the longitudinal direction of the first frames.

The invention according to claim 2 is characterized in the skeletal structure according to claim 1, wherein the non-joint portions of all the first frames are present on one side with respect to a central portion in the longitudinal direction of the first frames.

The invention according to claim 3 is characterized in the skeletal structure according to claim 2, wherein the non-joint portions of the first frames at both end portions in an arrangement direction of the plurality of first frames are present at positions closer to the central portion in the longitudinal direction of the first frames with respect to the non-joint portion of the first frame at a central portion in the arrangement direction.

The invention according to claim 4 is characterized in the skeletal structure according to any one of claims 1 to 3, wherein a plurality of reinforcing structure sections surrounded by a bead bulging into a ridge shape is formed on the panel.

The invention according to claim 5 is characterized in the skeletal structure according to claim 4, wherein the plurality of reinforcing structure sections is formed along the longitudinal direction of the first frames, and the non-joint portion of the first frame is present in a range including one or more boundaries between the reinforcing structure sections in the longitudinal direction of the first frames.

The invention according to claim 6 is characterized in the skeletal structure according to any one of claims 1 to 5, wherein the first frame and the second frame located at a corner of the panel are coupled with each other via a plate-like set bracket equipped with a projection nut.

The invention according to claim 7 is characterized in the skeletal structure according to any one of claims 1 to 6, wherein the panel and the frame are joined to each other on mutual joint surfaces by a solidified state after melting generated in the panel and the frame.

The invention according to claim 8 is characterized in the skeletal structure according to any one of claims 1 to 7, wherein an end portion of the first frame is joined to the second frame in an overlapping state.

Effects of the Invention

According to the invention of claim 1, since non-joint portions of all of first frames are arranged to match or overlap with each other with respect to the longitudinal direction of the first frame, in a case where a collision load or a deformation load is applied to the skeletal structure, it is possible to perform control so as to generate deformation in the matching or overlapping position of the non-joint portions in the longitudinal direction of the first frame.

This configuration enables generating deformation at a position other than a position that would receive a large deformation amount at the occurrence of deformation, making it possible to reduce the deformation amount.

According to the invention of claim 2, since the non-joint portions of all the first frames are present on one side with respect to a central portion in the longitudinal direction of the first frames, it is possible to generate deformation at a position other than the central portion that receives the large deformation amount at the occurrence of deformation, making it possible to reduce the deformation amount.

According to the invention of claim 3, the non-joint portions of the first frames at both end portions are arranged at positions closer to a central portion in the longitudinal direction of the first frames with respect to the non-joint portion of the first frame at the central portion. With this configuration, even when a collision load or a deformation load is applied to the center of the panel, it is possible to generate deformation along an arc along which the non-joint portions are arranged. This makes it possible to more effectively guide a deformation position and to reduce the deformation amount.

According to the invention of claim 4, since a plurality of reinforcing structure sections surrounded by beads is provided, it is possible to receive the load applied to the skeletal structure for each of the sections and suppress the overall deformation.

In addition, arranging the plurality of sections makes it possible to reduce the planar deflection and elastic deformation of the panel, leading to the reduction of the occurrence of abnormal noise due to return from the deformed state.

According to the invention of claim 5, the non-joint portion of the first frame is present in a range including one or more boundaries between mutual reinforcing structure sections in a longitudinal direction of the first frame. This configuration provides the non-joint portion in the range including the boundary between the mutual reinforcing structure sections likely to have deformation, and it is possible to control the deformation position further effectively and reduce the deformation amount.

According to the invention of claim 6, the first frame and the second frame located at a corner of the panel are coupled with each other via a set bracket. This makes it possible to couple the first frame with the second frame without causing interference with a projection nut provided on the set bracket and without adding a special structure to avoid interference.

According to the invention of claim 7, since the panel and the frame are joined to each other at mutual joint surfaces by a solidified state after melting generated in the panel and the frame. With this configuration, it is possible to provide a skeletal structure that is lightweight while maintaining high joining strength without a welding material.

According to the invention of claim 8, since an end portion of the first frame is joined to the second frame in an overlapping state, it is easy to ensure a wide area of the joint, making it possible to enhance the joining strength.

EMBODIMENTS FOR CARRYING OUT THE INVENTION

[Outline of First Embodiment]

Hereinafter, a first embodiment of the present invention will be described with reference to the drawings. While various technically preferable limitations for implementing the present invention are attached to the following embodiments, the scope of the present invention is not limited to the following embodiments and illustrative examples.

Figure 1:
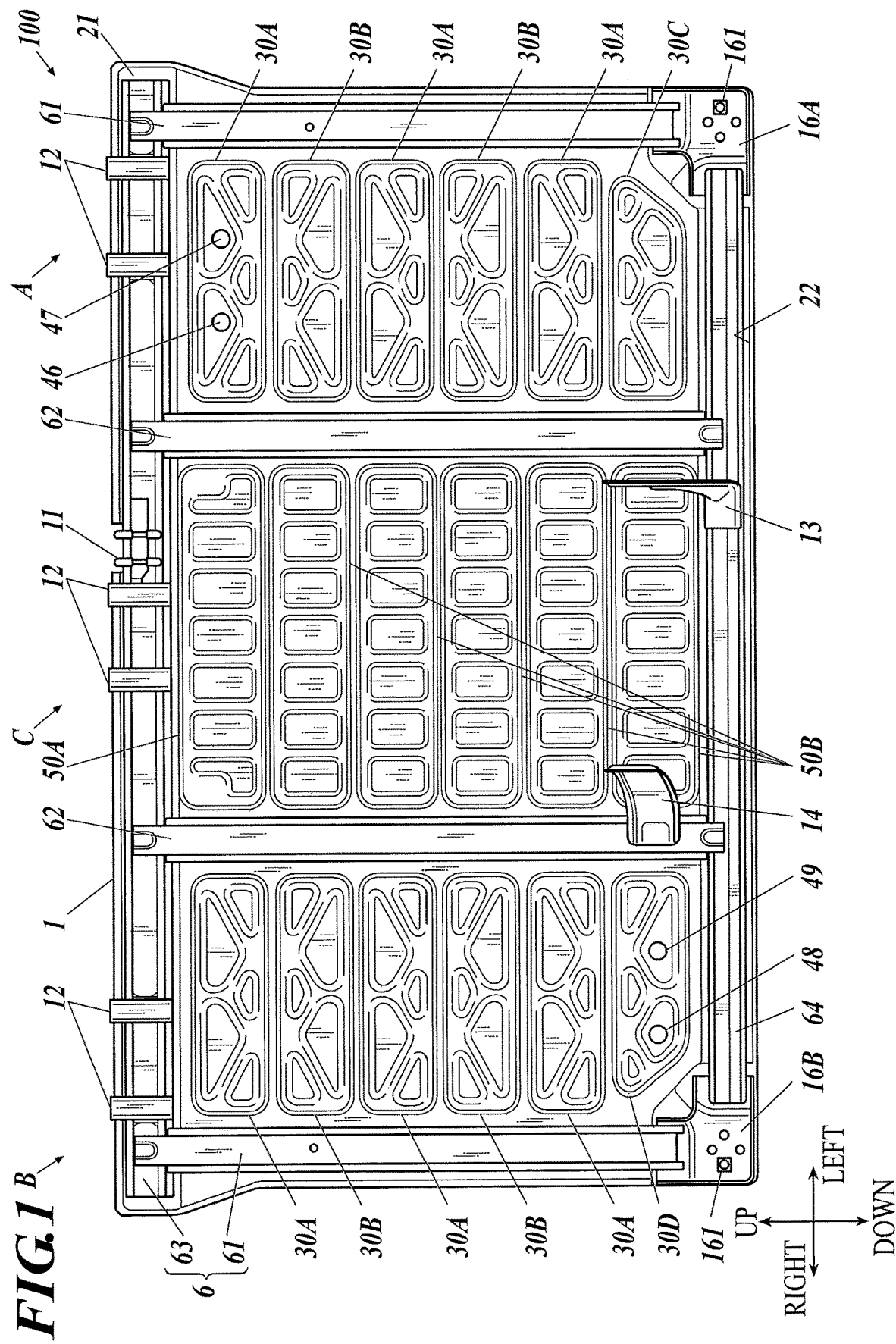
FIG. 1 This is a front view of a skeletal structure of a vehicle seat according to a first embodiment.
Figure 2:
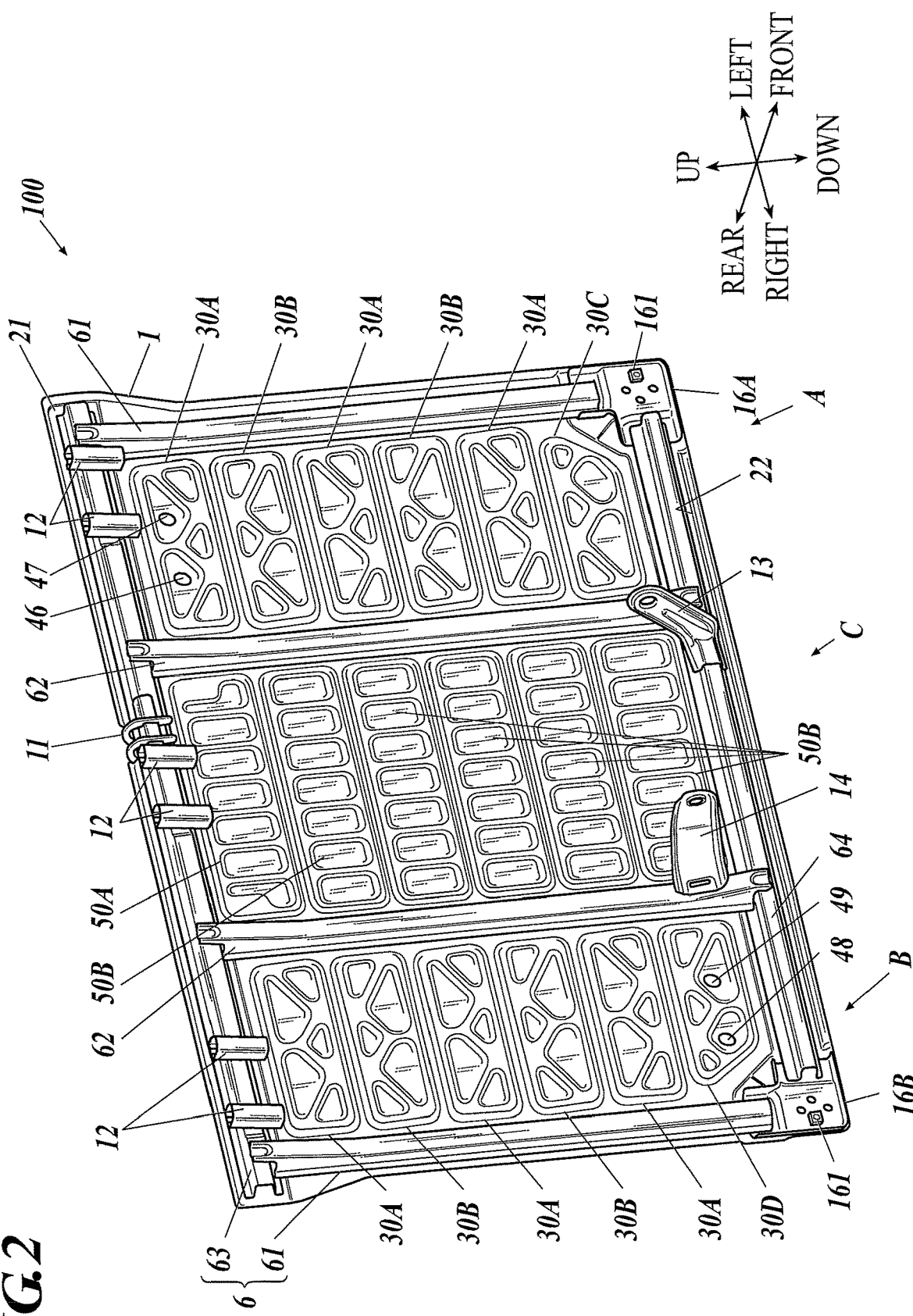
FIG. 2 This is a perspective view of a skeletal structure of a vehicle seat.
Figure 3:
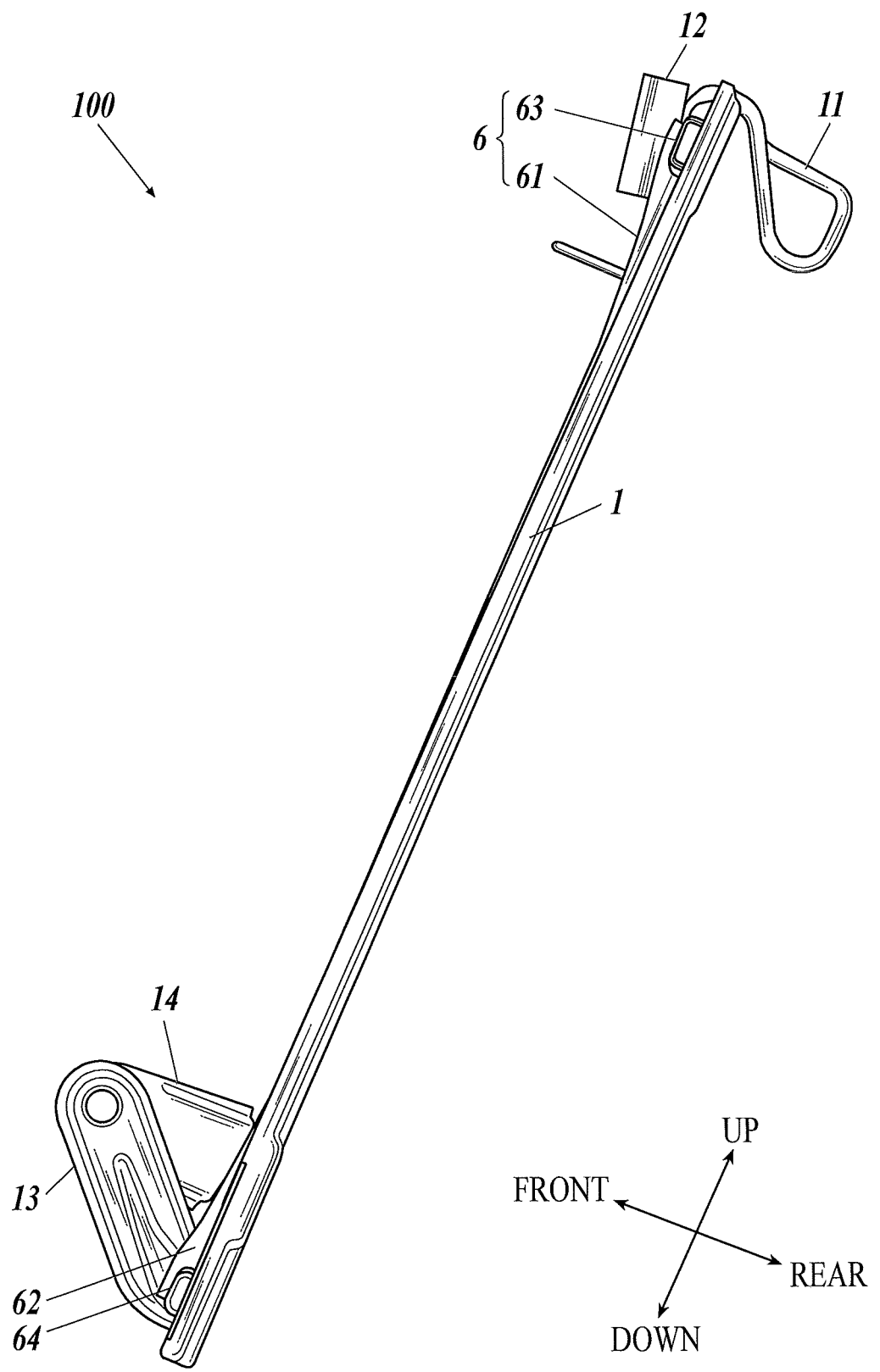
FIG. 3 This is a left side view of a skeletal structure of a vehicle seat.

FIGS. 1, 2, and 3 are a front view, a perspective view, and a left side view of a skeletal structure 100 of a vehicle seat, respectively. This vehicle seat is a rear seat of a plurality of passengers, and this skeletal structure (frame structure) 100 is to be a framework of the backrest of the rear seat. The skeletal structure 100 includes a foamed pad provided so as to enclose the skeletal structure 100 from the front side of the skeletal structure 100, and an external skin is further suspended on the surface of the skeletal structure 100. Being suspended is a state of the external skin covering the surface of the pad stretched along the surface of the pad.

The skeletal structure 100 includes a panel 1, a frame 6, a striker 11, a plurality of headrest support members 12, a pair of armrest brackets 13 and 14.

The panel 1 has a substantially rectangular shape and is a metal plate formed of steel, an aluminum alloy, or the like. As illustrated in FIG. 1, the panel 1 is mounted on a vehicle seat in a state where a direction along the long side of the panel 1 comes along a lateral (left-right) direction and a direction along the short side comes along a vertical (up-down) direction.

In a state where the skeletal structure 100 is mounted on the vehicle seat, the left side of the vehicle is defined as the left side of the skeletal structure 100 and the right side of the vehicle is defined as the right side of the skeletal structure 100. In FIG. 1, the front side of the page is defined as the "front" and the back side of the page is defined as the "rear".

[Outline of Frame]

As illustrated in FIGS. 1 to 3, the frame 6 includes: side frames 61 and 61 as first frames attached on the left and right end portions of the front surface of the panel 1, respectively, along the up-down direction; middle frames 62 and 62 as first frames attached on the front surface of the panel 1 along the up-down direction at a portion slightly closer to the central portion from the left and right end portions; an upper frame 63 as a second frame attached on an upper end portion on the front side of the panel 1 along the left-right direction; and a 'lower frame 64 as a second frame provided at the lower end portion of the front side of the panel 1 along' the left-right direction.

Each of the frames 61 to 64 is a metal support column formed of steel, aluminum alloy, or the like.

The upper end portions of the side frames 61 and 61 and the middle frames 62 and 62 are joined to the upper frame 63 by laser welding. The lower end portions of the side frames 61 and 61 and the middle frames 62 and 62 are joined to the lower frame 64 by laser welding.

All the frames 61 to 64 have flange portions opposed to the panel 1, and the flange portions are joined to the panel 1 by laser welding.

Detailed structures of these frames 61 to 64 will be described below.

[Outline of Panel]

As illustrated in FIGS. 1 and 2, the panel (pan frame) 1 is a rectangular plate-shaped metal plate elongated in the left-right direction, and its upper portion is slightly widened.

Additionally, an edge formed by a forwardly raised entire outer periphery of the front surface of the panel (pan frame) 1 is provided to form a tray-like shape.

Furthermore, groove-shaped recesses 21 and 22 recessed rearward are respectively formed in the upper end portion and the lower end portion of the front surface of the panel 1 along the left-right direction. The upper frame 63 of the frame 6 is provided inside the upper recess 21 and the lower frame 64 is provided at the lower recess 22.

The portion between the upper and lower recesses 21 and 22 on the front surface of the panel 1 is divided into three regions by the left and right side frames 61 and 61 and the left and right middle frames 62 and 62. That is, the front surface of the panel 1 is divided into three regions, namely, a left region A between the left-side side frame 61 and the left-side middle frame 62, a right region B between the right-side side frame 61 and the right-side middle frame 62, and a central region C between the left-side middle frame 62 and the right-side middle frame 62.

[Panel: Left Region]

The left region A of the panel 1 includes reinforcing structure sections 30A, 30B, and 30C formed to be arranged vertically. That is, the sections 30A, 30B, 30A, 30B, 30A, and 30C are arranged in order from the top.

Figure 4:
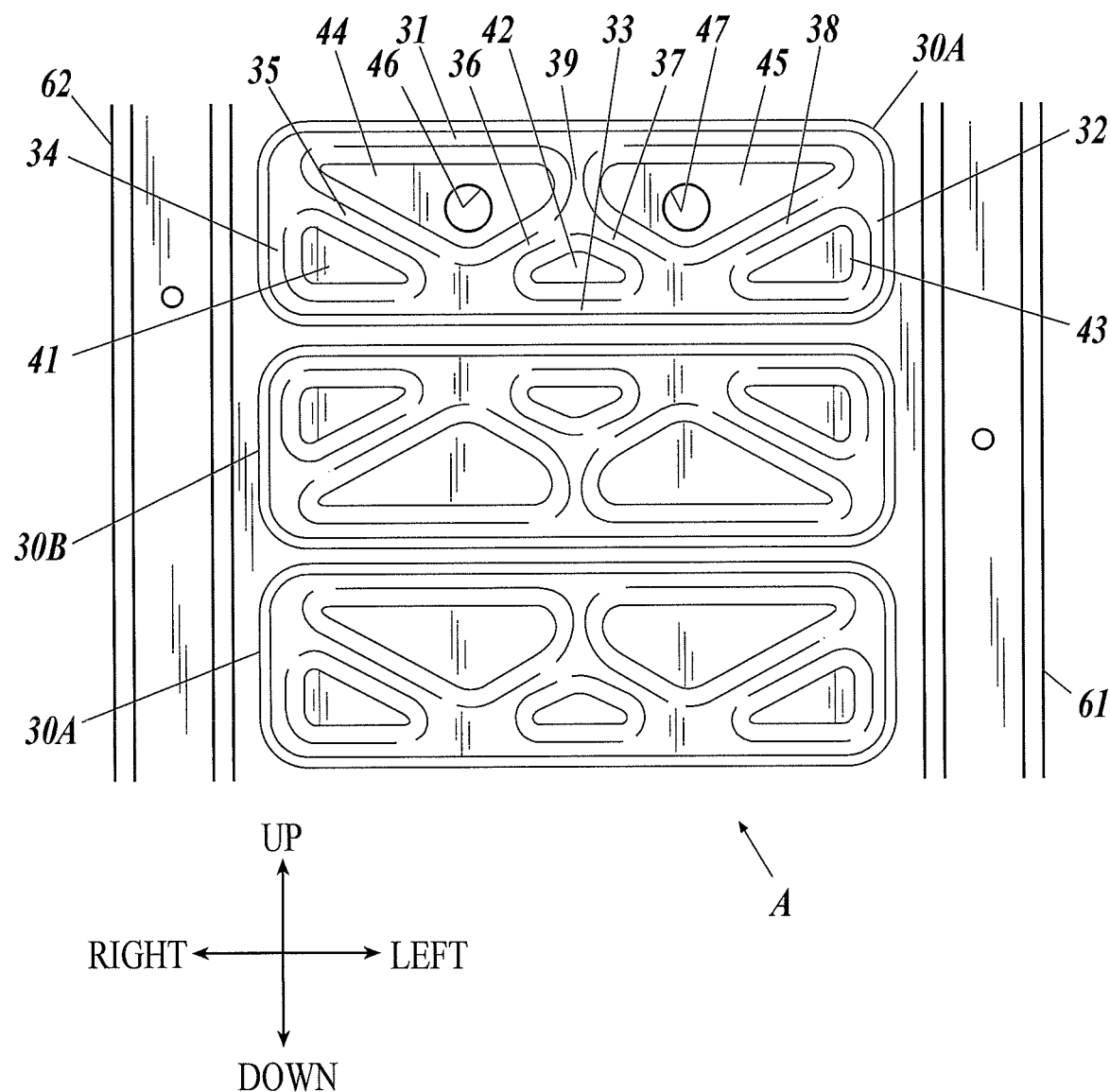
FIG. 4 This is an enlarged front view illustrating three sections being extracted.

FIG. 4 is an enlarged front view of extracted upper three sections 30A, 30B, and 30A.

As illustrated in FIG. 4, the reinforcing structure section 30A includes four beads 31 to 34 surrounding the section 30A and auxiliary beads 35 to 39 dividing the section 30A surrounded by the four beads 31 to 34 into subsections 41 to 45.

The bead is a ridge-shaped (rail-like) structure formed so as to bulge forward from the front surface of the panel 1 (this similarly applies to the auxiliary bead). In a case where a flat metal plate is used to form the panel, winding or bending would be likely to occur on its flat surface. Instead of this, forming ridge-shaped beads by plastic working, however, it is possible to enhance the rigidity to prevent bending of the beads.

The reinforcing structure section 30A has a rectangular shape, four sides of the rectangle are formed with the beads 31 and 33 along the left-right direction and the beads 32 and 34 along the up-down direction. Adjacent beads forming a corner are linked with each other by an arc-shaped bead.

On the inner side of the rectangular section 30A surrounded by the four beads 31 to 34, four auxiliary beads 35 to 38 connected in a zigzag manner in the left-right direction and auxiliary bead 39 formed in the up-down direction at the central portion in the left-right direction are provided.

In a lower right portion of the section 30A, a right triangular truss-shaped subsection 41 is formed, surrounded by the beads 33, 34 and the auxiliary bead 35.

In addition, in the lower central portion of the section 30A, a truss-shaped subsection 42 of an isosceles triangle shape is formed, surrounded by the bead 33 and the auxiliary beads 36 and 37.

In a lower left portion of the section 30A, a right triangular truss-shaped subsection 43 is formed, surrounded by the beads 32 and 33 and the auxiliary bead 38.

In addition, in the upper right portion of the section 30A, a truss-shaped subsection 44 of a substantially triangle shape is formed, surrounded by the bead 31 and the auxiliary beads 35, 36, and 39.

In addition, in the upper left portion of the section 30A, a truss-shaped subsection 45 of a substantially triangle shape is formed, surrounded by the bead 31 and the auxiliary beads 37, 38, and 39.

The reinforcing structure section 30A formed with the beads 31 to 34 and the auxiliary beads 35 to 39 is bilaterally symmetrical.

The reinforcing structure section 30B has a pattern shape formed with the plurality of beads and the plurality of auxiliary beads being vertically inverted pattern shape of the section 30A. That is, the section 30B has a line-symmetrical pattern shape about a boundary line with the adjacent section 30A along the left-right direction, as a center.

As described above, since the shape and arrangement of the four beads, five auxiliary beads and four subsections of the section 30B are line-symmetrical with the section 30A, a detailed description thereof will be omitted.

The reinforcing structure section 30C has a pattern shape formed with a plurality of beads and a plurality of auxiliary beads being similar to the pattern shape of the section 30B.

This section 30C is located at the lowermost side within the region A, and thus, in order to avoid interference with a set bracket 16A mounted at a lower left corner of the panel 1, the left-side bead among the four beads on the outer periphery of the section 30C is formed to be inclined so as to form the outer shape of the section 30C in a trapezoidal shape.

Except for the outer shape being in the trapezoidal shape, the section 30C has almost the same structure as the section 30B, and thus a detailed explanation will be omitted.

The subsections 44 and 45 of the section 30A located at the upper end portion of the region A include through holes 46 and 47, respectively, formed to penetrate the panel 1 in a front-rear direction.

These through holes 46 and 47 are used for positioning the panel 1 with respect to the laser welding apparatus in joining individual members to the panel 1.

Moreover, in order to position the orientation of the panel 1 with higher accuracy, similar through holes 48 and 49 are separately formed in the two subsections in a section 30D (described below) located at the lower end portion of the region C of the panel 1.

Note that the number of through holes is not limited to four, and it is sufficient to have at least two through holes. In a case where two through holes are provided, it is desirable to form one each at the diagonal of the panel 1.

Alternatively, it is also allowable to provide four or more through holes to reduce the weight of the panel 1 (for example, providing the hole for each of the sections).

[Panel: Right Region]

The right region B of the panel 1 includes reinforcing structure sections 30A, 30B, and 30D formed to be arranged vertically as illustrated in FIG. 1. That is, the sections 30A, 30B, 30A, 30B, 30A, and 30D are arranged in order from the top.

The sections 30A and 30B are the same as the sections 30A and 30B of the reinforcing structure formed in the left region A described above.

Moreover, the section 30D has a pattern shape formed with the plurality of beads and the plurality of auxiliary beads being horizontally inverted pattern shape of the section 30C, that is, a line-symmetrical pattern shape with respect to the section 30C about an axis along an up-down direction as a center. In this manner, since the shape and arrangement of the four beads, five auxiliary beads and four subsections of the section 30D are line-symmetrical with the section 30C, a detailed description thereof will be omitted.

[Panel: Central Region]

The central region C of the panel 1 includes reinforcing structure sections 50A and 50B formed to be arranged vertically as illustrated in FIG. 1. That is, the section 50A is formed at the upper end portion, and five sections 50B are formed to be arranged under the section 50A.

The reinforcing structure section 50B includes four beads surrounding the section 50B and six auxiliary beads dividing the section 50B surrounded by the four beads into subsections.

The four beads form four sides of a rectangle similarly to the above-described section 30A, with its corner having an arc shape like the section 30A.

Each of the six auxiliary beads is arranged along the up-down direction at uniform intervals in the left-right direction between two beads along the left-right direction.

This results in arrangement of seven rectangular subsections having the same rectangular shape formed side by side in the left-right direction in the section 50B.

While the reinforcing structure section 50A is different from the section 50B in that the upper half of the beads on both the left and right sides are wider, the other configuration is the same, and thus, the detailed description will be omitted.

[Detailed Structure of Frame]

Figure 5:
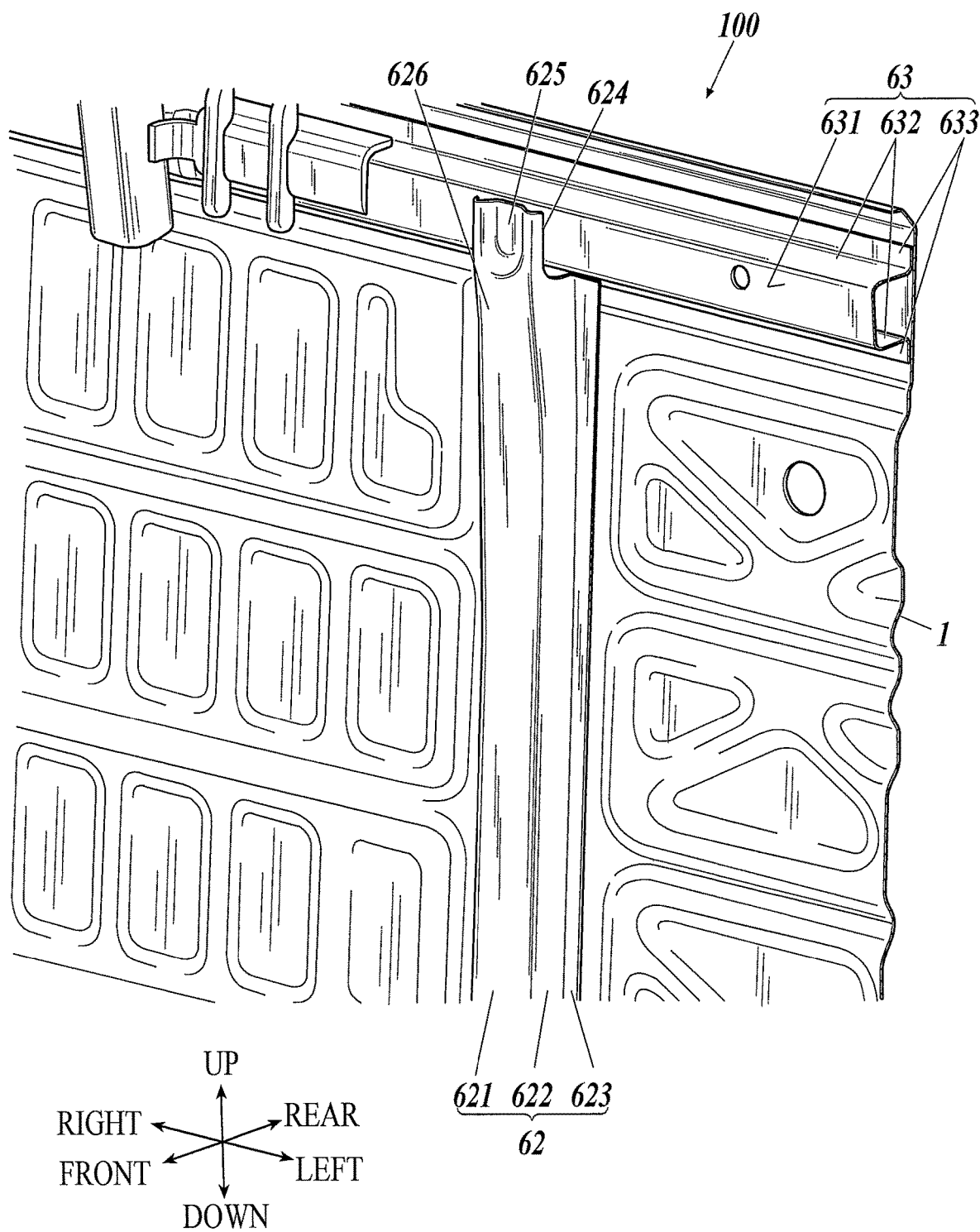
FIG. 5 This is a perspective view of a joint between an upper frame and a middle frame.
Figure 6:
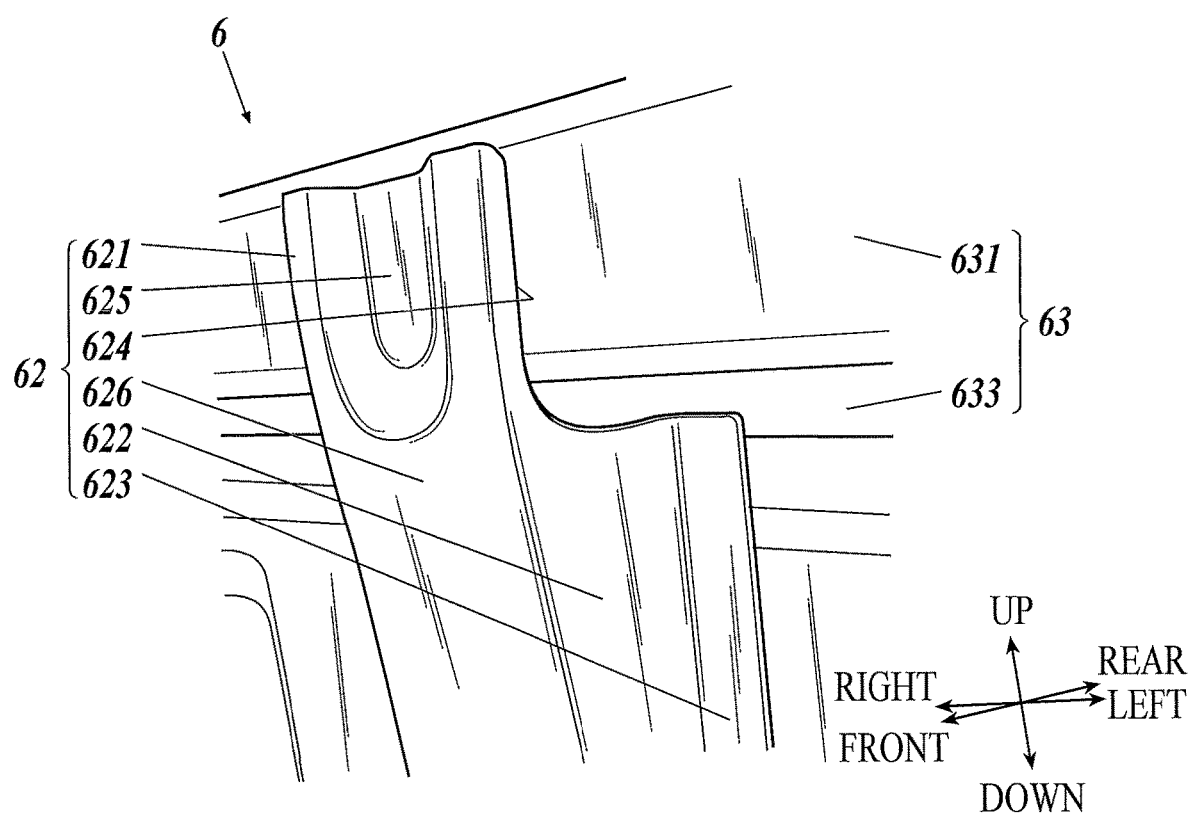
FIG. 6 This is an enlarged perspective view of the joint of FIG. 5.

FIG. 5 is a perspective view of a joint between the upper frame 63 and the middle frame 62, and FIG. 6 is an enlarged perspective view of the joint.

As illustrated in the drawing, the upper frame 63 has an open cross-sectional shape and includes an opposing wall 631 opposed to the panel 1 and a pair of side walls 632 and 632 rising from both side portions of the opposing wall 631 toward the panel 1, and flange portions 633 and 633 extending outward in the width direction from the end portion of the pair of side walls 632 and 632 on the panel 1 side.

Similarly, other frames constituting the frame 6, namely, the side frames 61 and 61, the middle frames 62 and 62, and the lower frame 64 have similar open cross-sectional shapes, and include opposing wall, a pair of side walls, and the flange portion.

All of the frames constituting the frame 6 are joined in a state where the flange portion is in surface contact with the front surface of the panel 1.

Figure 7:
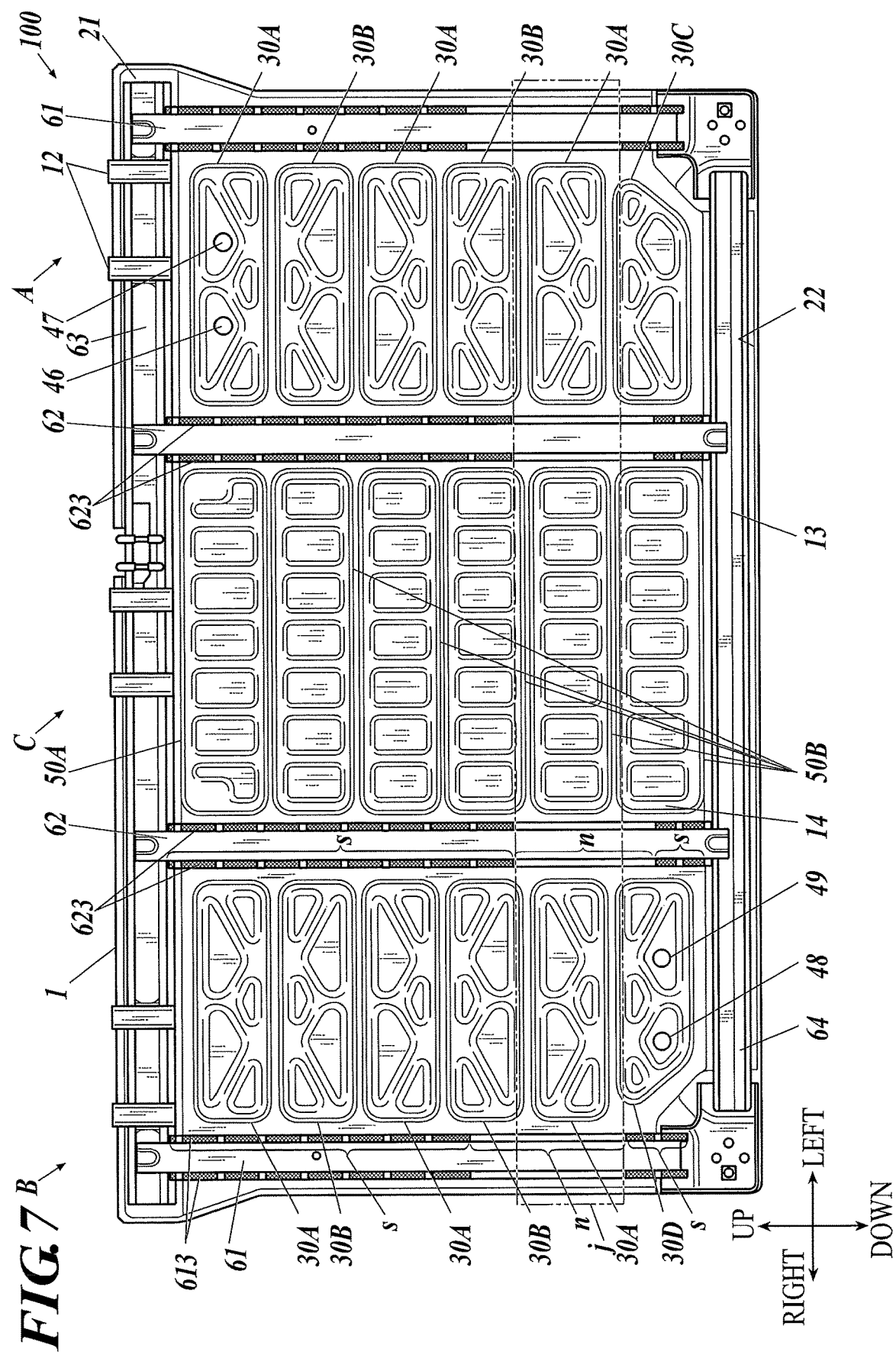
FIG. 7 This is a front view of a skeletal structure illustrating a joint of a side frame and a middle frame with respect to a panel illustrated in a pattern.

FIG. 7 is a front view of the skeletal structure 100 in which hatched patterns are attached to joints (laser welding spots) on the flange portions 613 and 623 of the side frames 61 and 61 and the middle frames 62 and 62 with the panel 1.

The flange portions 613 and 623 on each of the left and right side frames 61 and 61 and the left and right middle frames 62 and 62, respectively, are joined by laser welding. That is, each of the flange portions 613 and 623 is joined due to a solidified state after melting that occurs in the material for forming the flange portions 613 and 623 and the material for forming the panel 1.

Each of the left and right side frames 61 and 61 and the left and right middle frames 62 and 62 includes a joint portion s and a non-joint portion n with respect to the panel 1 along the longitudinal direction. Meanwhile, the left and right side frames 61 and 61 and the left and right middle frames 62 and 62 are joined by laser welding, and thus, there is a need to hold the flange portions 613 and 623 at regular intervals by jigs so as not to generate a gap at a contact surface between the flange portions 613 and 623 and the panel 1. Accordingly, there is a discontinuity of welding due to the attachment of the jigs within the range of the joint portion s. The non-joint portion n, however, does not represent this discontinuity inevitably generated in welding, but represents a region where welding is not performed in a range of a certain length or more.

As illustrated in FIG. 7, the ranges of the non-joint portions n in the up-down direction in the two side frames 61 and 61 match with each other, and these ranges do not include middle positions in the up-down directions of the side frames 61 and 61, and are located below the middle positions.

Moreover, the ranges of the non-joint portions n in the up-down direction in the two middle frames 62 and 62 also match with each other, and these ranges do not include the positions as the central portions in the up-down directions of the middle frames 62 and 62, and are located below the middle positions.

In addition, while the non-joint portion n of the side frame 61 and the non-joint portion n of the middle frame 62 overlap each other in an overlapping range j in the up-down direction, the non-joint portion n of the side frame 61 is located above the non-joint portion n of the middle frame 62.

As described above, by providing the non-joint portion n on the left and right side frames 61 and 61 and the left and right middle frames 62 and 62, it is possible to control a plastic deformation portion generated in a case where a load such as collision is applied to the skeletal structure 100. That is, in the case of a flat plate-shaped structure such as the skeletal structure 100, deformation occurring in the central portion thereof increases the deformation amount.

For example, in a case where the flange portions 613 and 623 of the left and right side frames 61 and 61 and the left and right middle frames 62 and 62 are joined over the entire length and there is no non-joint portion n, great deformation can be generated in the central portion.

In contrast, in a case where the non-joint portion n is provided on the left and right side frames 61 and 61 and the left and right middle frames 62 and 62, it is possible to guide the deformation position to the non-joint portion n where the joining strength is low. In particular, since the non-joint portion n of each of the left and right side frames 61 and 61 and the left and right middle frames 62 and 62 is located on the lower side which is one side with respect to the central portion in the up-down direction, it is possible to avoid deformation of the central portion.

This makes it possible to generate deformation at the side below the central portion where large deformation is likely to occur and thus, reduce the deformation amount and the deflection amount.

Moreover, since the non-joint portions n of the outer side frames 61 and 61 are positioned slightly higher than the non-joint portions n of the middle frames 62 and 62 on the central portion, the non-joint portions n of the frames 61, 61, 62, and 62 are arranged in a range roughly along the arc about the central portion of the skeletal structure 100 as a center, it is possible to easily generate deformation along the arc, and it is possible to suppress the deformation of the central portion in a case where a load is applied to the central portion of the skeletal structure 100, and instead possible to deform the surrounding portion, leading to further effective reduction of the deformation amount and the deflection amount.

While the above describes a more preferable example in which the non-joint portions n of the individual frames 61, 61, 62, and 62 are arranged approximately along the arc about the central portion of the skeletal structure 100 as a center, it is still possible to reduce the deformation amount and the deflection amount even in a case where non-joint portions n of the individual frames 61, 61, 62, and 62 are aligned at the same height.

Moreover, the overlapping range j of the non-joint portion n of the side frames 61 and 61 and the non-joint portion n of the middle frames 62 and 62 are arranged to include boundaries between adjacent sections with respect to a portion of the reinforcing structure sections 30A through 30D, 50A, and 50B formed in each of the regions A to C of the panel 1 described above.

That is, in the case of the region A, the boundary between the third section 30B from the bottom and the second section 30A from the bottom and the boundary between the second section 30A from the bottom and the lowermost section 30C are inside the overlapping range j in the up-down direction.

Moreover, in the case of the region B, the boundary between the third section 30B from the bottom and the second section 30A from the bottom and the boundary between the second section 30A from the bottom and the lowermost section 30D are inside the overlapping range j in the up-down direction.

Moreover, in the case of the region C, the boundary between the third section 50B from the bottom and the second section 50B from the bottom and the boundary between the second section 50B from the bottom and the lowermost section 50B are inside the overlapping range j in the up-down direction.

The boundary between the sections of the reinforcing structure tends to be deformed along the boundary as compared with the other portions. Accordingly, by including the boundary between the sections within the overlapping range j in the up-down direction as described above, it is possible to more effectively guide the deformation position to the lower side than the central portion and to more effectively reduce the deformation amount and the deflection amount.

While this is a case where the boundary between the two sections arranged in the up-down direction is included in the overlapping range j, the number may be one, or three or more.

[Joint Structure of Individual Frames]

Figure 8:
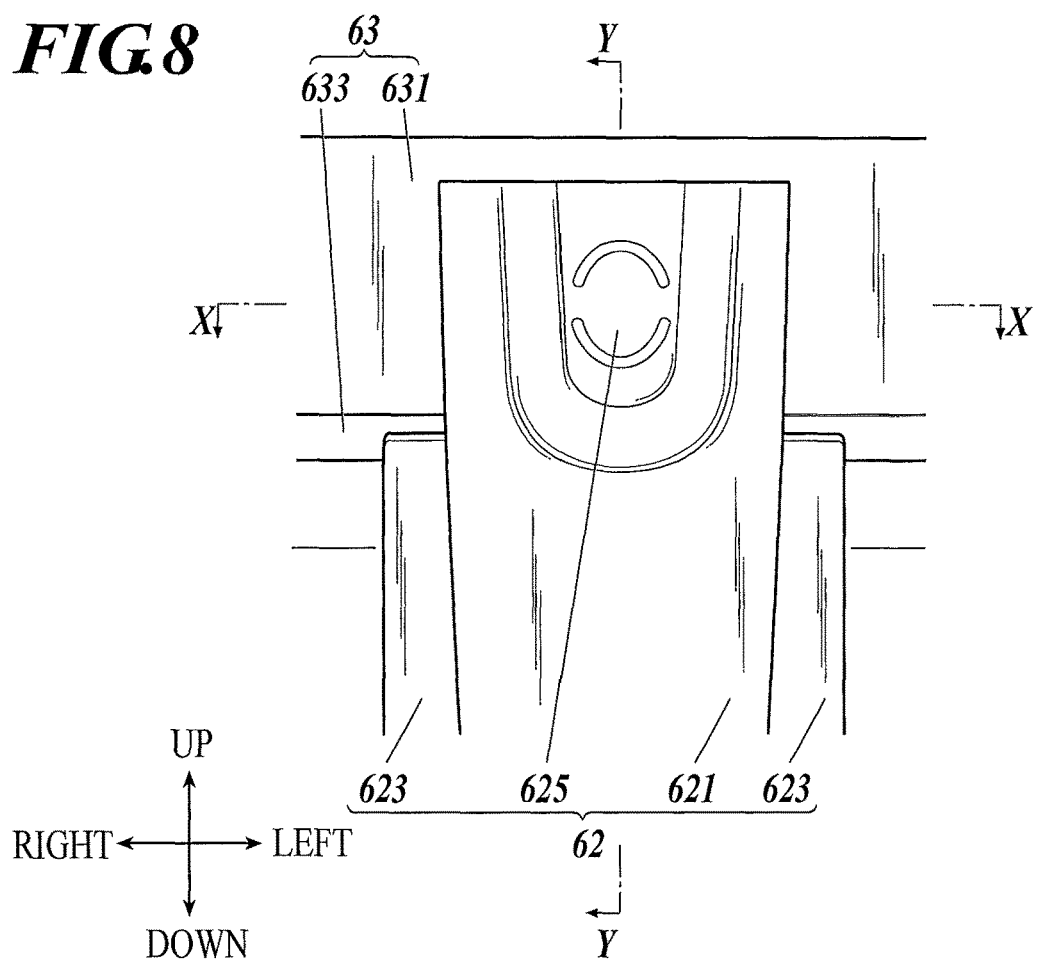
FIG. 8 This is a front view of a joint between an upper frame and a middle frame.
Figure 9:
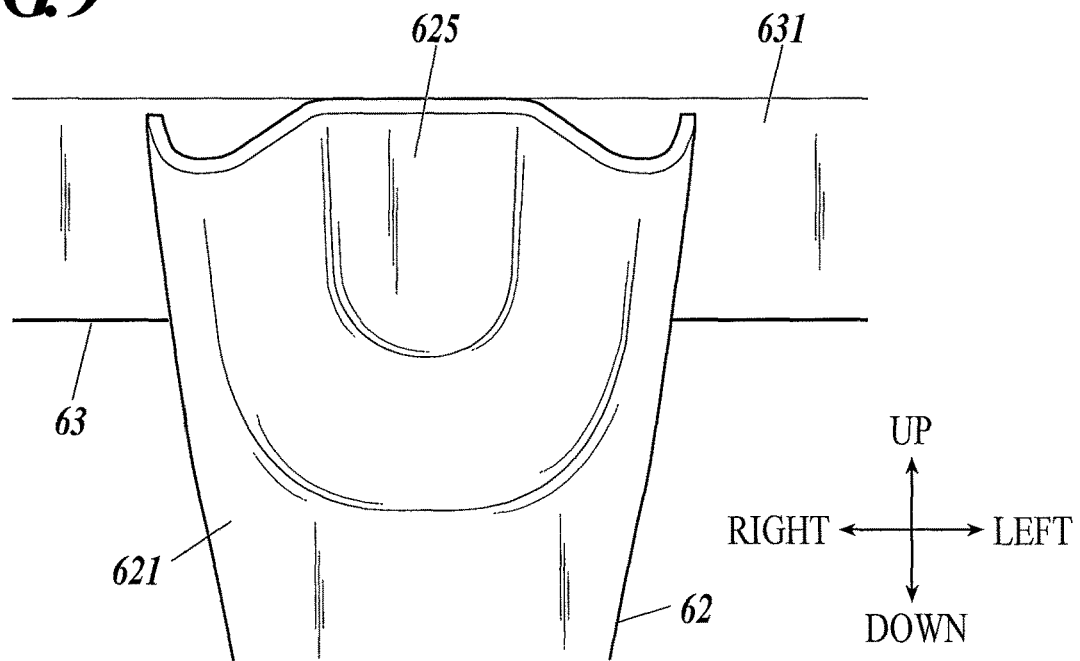
FIG. 9 This is a perspective view of a joint between an upper frame and a middle frame viewed diagonally from the front upper side.
Figure 10:
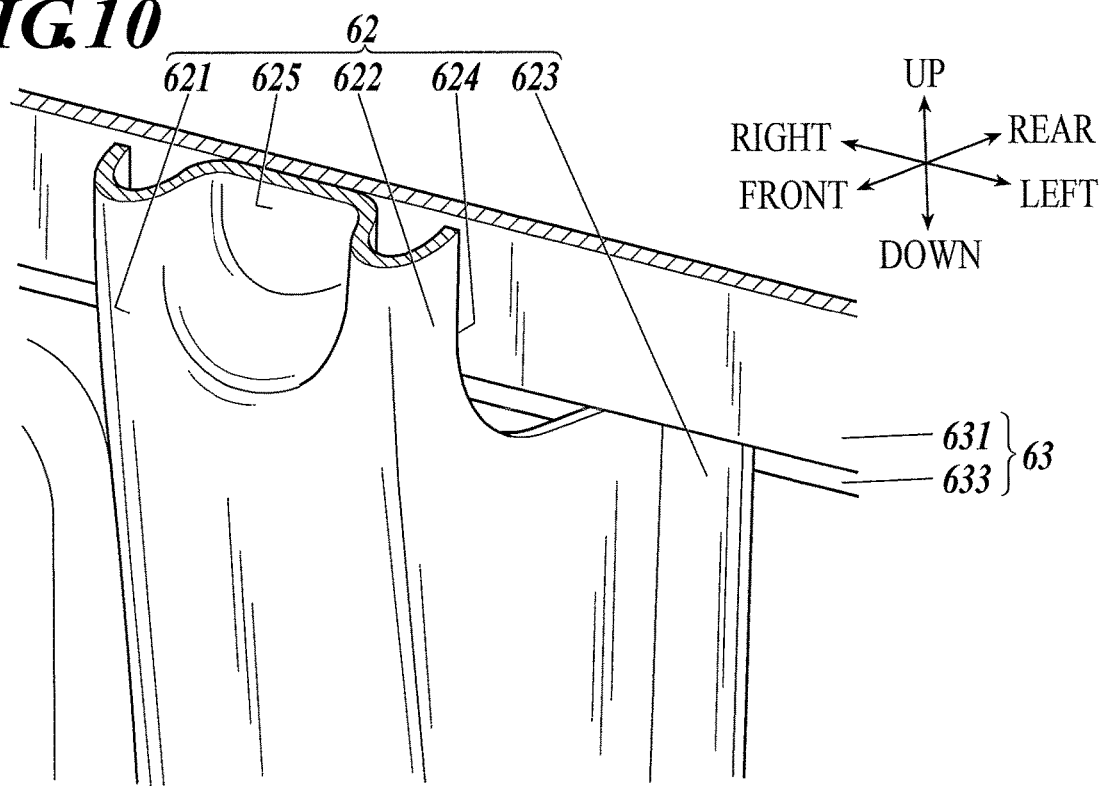
FIG. 10 This is a perspective view of a cross section taken along line X-X of FIG. 8 as viewed diagonally from the left front upper side.
Figure 11:
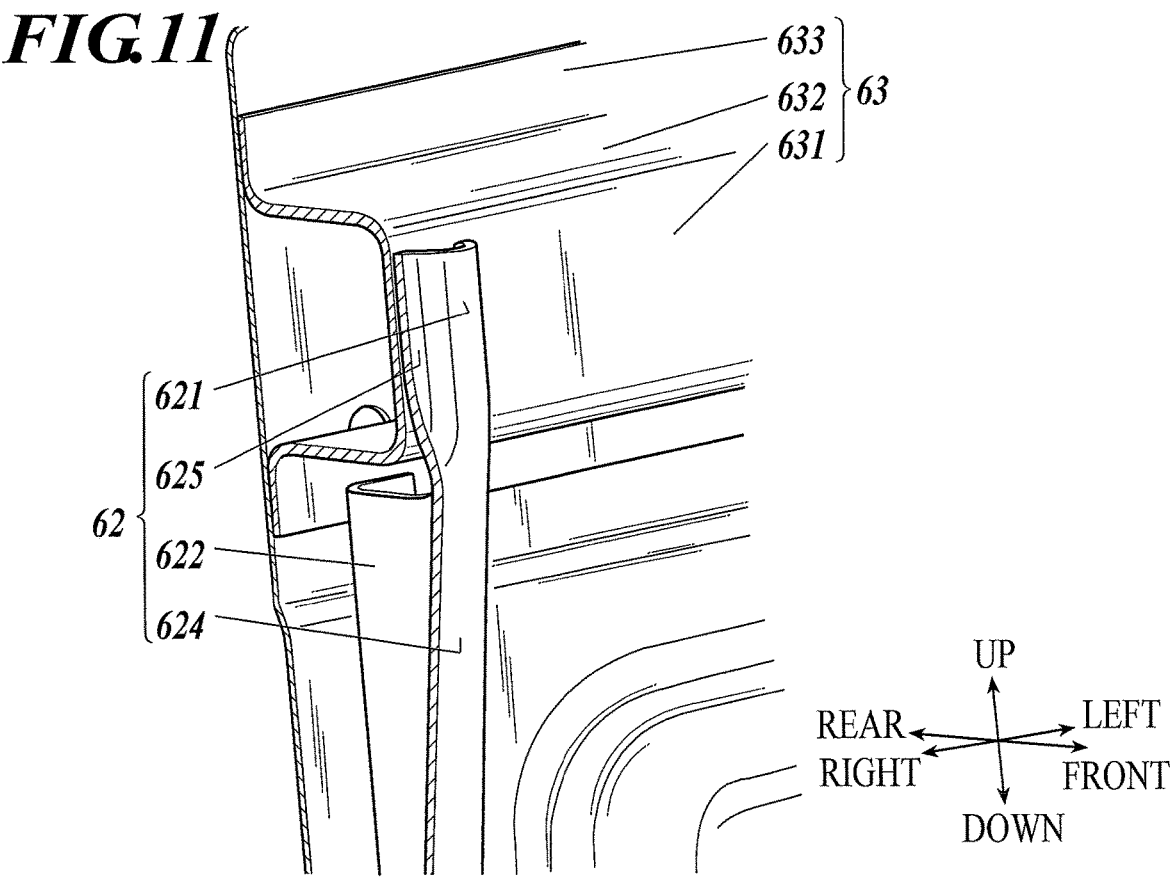
FIG. 11 This is a perspective view of a cross section taken along line Y-Y of FIG. 8 as viewed diagonally from the right front upper side.

FIG. 8 is a front view of the joint between the upper frame 63 and the middle frame 62. FIG. 9 is a perspective view as viewed diagonally from the front upper side. FIG. 10 is a perspective view of the cross section taken along line X-X of FIG. 8 viewed diagonally from the left front upper side. FIG. 11 is a perspective view of the cross section taken along line Y-Y of FIG. 8 as viewed diagonally from the right front upper side.

The joint structure between the frames will be described with reference to FIGS. 5, 6, and 8 to 11.

The upper end portion of the middle frame 62 is formed into notches 624 and 624 by removing the flange portions 623 and 623 on both sides and cutting off a pair of side walls 622 and 622 up to the vicinity of an opposing wall 621. Due to the notches 624 and 624, the upper end portion of the middle frame 62 includes merely the opposing wall 621 and the slightly-left side wall 622.

In joining the upper frame 63 to the middle frame 62, the upper frame 63 enters the notches 624 and 624.

In a state where the upper frame 63 and the middle frame 62 are joined with each other, the notches 624 and 624 have such a shape that a gap is generated with respect to the lower side wall 632 of the upper frame 63 (refer to FIGS. 6 and 10). With this configuration, when a load is applied to the skeletal structure 100, it is possible to effectively avoid the generation of abnormal noise caused by the rubbing between the edges of the notches 624 and 624 and the lower side wall 632 of the upper frame 63. Moreover, this gap makes it possible to absorb assembling errors and processing errors of the upper frame 63 and the middle frame 62, and to easily perform assembly and joining operation.

Furthermore, at the upper end portion of the opposing wall 621 of the middle frame 62, an irregular structure 625 in which the front surface of the opposing wall is recessed rearward in a U shape is formed so as to protrude toward the panel 1 side.

As illustrated in FIGS. 9 and 10, due to the formation of the irregular structure 625, the opposing wall 621 of the upper end portion of the middle frame 62 is recessed at its central portion, protruding rearward, with its tip end portion being formed into a flat shape. The flat surface at the tip end is joined by laser welding in a state of being in surface contact with the front surface of the opposing wall 631 of the upper frame 63.

Both the left and right sides of the recess in the central portion of the irregular structure 625 are relatively protruding forward and have a ridge-shape along the up-down direction.

Furthermore, the irregular structure 625 extends downward from the upper end portion of the middle frame 62 to a length approximately equal to or greater than the vertical width of the opposing wall 631 of the upper frame 63.

Since the upper end portion of the middle frame 62 has most of the pair of side walls 622 being removed by the notch 624, the strength in the upper end portion of the middle frame 62 against the load in the front-rear direction by the pair of side walls 622 is reduced as compared to the case without the notches.

Still, since the upper end portion of the middle frame 62 includes the ridges formed along the up-down direction by the irregular structure 625 on the left and right sides, it is possible to enhance the rigidity of the upper end portion of the middle frame 62 to achieve sufficient strength against the load in the front-rear direction.

Moreover, the lower side of the irregular structure 625 in the opposing wall 621 of the middle frame 62 includes an inclined surface 626 inclined in a direction in which the opposing wall 621 separates away from the panel 1 in an upward direction.

Due to this inclined surface 626, the width of the pair of side walls 622 in the front-rear direction is wider than the lower portion in the vicinity of the upper end portion of the middle frame 62. With this configuration, even when the notches 624 are formed in the pair of side walls 622, the side walls 622 are not completely removed, making it possible to ensure the strength of the upper end portion of the middle frame 62.

In addition, in the middle frame 62, the upper end portions of the flange portions 623 and 623 overlap with the lower flange portion 633 of the upper frame 63 on the lower side of the notches 624 and 624 and joined with each other by laser welding. This further enhances the joining strength between the middle frame 62 and the upper frame 63.

As described above, the upper frame 63 is joined to the inside of the groove-like recess 21 recessed rearward on the front surface of the panel 1. Since the depth of the recess 21 matches the thickness of the flange portion 633 of the upper frame 63, the flange portion 623 of the middle frame 62 has no gap with respect to the front surface of the panel 1 even when the flange portion 623 of the middle frame 62 is overlapped and joined in front of the flange portion 633 of the upper frame 63. This makes it possible to satisfactorily join the flange portion 623 of the middle frame 62 to the front surface of the panel 1 by laser welding.

As illustrated in FIGS. 1 and 2, the lower end portion of the middle frame 62 has the same structure as the structures of the notched portions 624 and 624, the irregular structure 625, and the inclined surface 626 at the upper end portion, and is joined to the lower frame 64.

Furthermore, the upper end portion of the side frame 61 has the same structure as the structure of the notched portions 624 and 624, the irregular structure 625, and the inclined surface 626 at the upper end portion of the middle frame 62 and is joined to the upper frame 63, while the lower end portion of the side frame 61 is joined to the lower frame 64 by a structure different from the structure of the middle frame 62.

The lower end portions of the left and right side frames 61 are joined to the left and right end portions of the lower frame 64. There is a need to provide a projection nut to be used in attaching the skeletal structure 100 to the seat frame at the lower corner of the skeletal structure 100, which is the joining position. Therefore, in order to avoid interference, it is difficult to extend the lower end portions of the left and right side frames 61 and the left and right end portions of the lower frame 64 to the lower corner of the skeletal structure 100.

Accordingly, the lower end portion of the left-side side frame 61 is coupled to the left end portion of the lower frame 64 via the plate-like set bracket 16A including the projection nut 161. The lower end portion of the right-side side frame 61 is coupled to the right end portion of the lower frame 64 via a plate-like set bracket 16B including the projection nut 161.

As illustrated in FIGS. 1 and 2, the set bracket 16A is an L-shaped metal plate in front view, and is joined to the left end portion of the recess 22 on the front surface of the panel 1 by laser welding.

In the set bracket 16A, the projection nut 161 is fixedly mounted by projection welding onto the front surface of a corner of the L-shape. A bolt to fix the skeletal structure 100 to the vehicle seat can be screwed into the projection nut 161 via a through hole (not illustrated) provided in the lower corner of the panel 1.

Moreover, in the set bracket 16A, the lower end portion of the flange portion of the left-side side frame 61 is joined to the front surface of an extension extending upward from the corner by laser welding.

Furthermore, in the set bracket 16A, the left end portion of the flange portion of the lower frame 64 is joined to the front surface of an extension extending rightward from the corner by laser welding.

With this configuration, the set bracket 16A couples the lower end portion of the left-side side frame 61 and the left end portion of the lower frame 64.

Moreover, a flange portion rising frontward is formed from the left edge of the extension extending above the set bracket 16A to the lower edge of the extension extending rightward, and a flange portion rising frontward is formed from the right edge of the extension extending above the set bracket 16A to the upper edge of the extension extending rightward. These constitute a reinforcing structure of the set bracket 16A to reduce deflection and deformation against the load of the set bracket 16A.

Moreover, the set bracket 16B has a structure symmetrical with the set bracket 16A, and thus, a detailed description thereof will be omitted. Similarly to the set bracket 16A, the set bracket 16B couples the lower end portion of the right-side side frame 61 and the right end portion of the lower frame 64.

Since the projection nut 161 is joined by projection welding, it is difficult to directly join the projection nut 161 to the thin panel 1. That is, it is difficult to attach the projection nut 161 to the panel 1 without using the set brackets 16A and 16B thicker than the panel 1.

Since the right and left side frames 61 and 61 are coupled with the lower frame 64 using these indispensable set brackets 16A and 16B, it is possible to couple the left and right side frames 61 and 61 with the lower frame 64 without interfering with the projection nut 161.

In addition, the set brackets 16A and 16B have high rigidity because they are thicker than the panel 1 and include the flange portions. Accordingly, even when the left and right side frames 61 and 61 are coupled with the lower frame 64 via the set brackets 16A and 16B, it is still possible to maintain sufficiently high coupling strength between each other.

[Other Members]

As illustrated in FIGS. 1 and 2, the support member 12 of the headrest is joined to the upper frame 63 by welding, in one pair for each of the regions A, B, and C of the panel 1 described above. Each of the support members 12 has a square tubular shape and is attached along the up-down direction. The headrest is supported in a state where a support column of the headrest is inserted into the inside of the support member 12 from above.

The striker 11 is a metal fitting for fixing the backrest of the rear seat and the skeletal structure 100 to the vehicle body. The lower end portion of the frame 6 is fixed by the above-described two projection nuts 161 and 161, while at the upper end portion of the frame 6, the striker 11 is locked to a fastener provided on the vehicle body.

The striker 11 is formed by bending a single thick metal wire material. Both end portions of the wire material are joined to the opposing wall 631 by laser welding at the middle portion of the upper frame 63 in the longitudinal direction, and an intermediate portion of the wire material is folded rearward from the upper end portion of the panel 1, further bent into a hook shape extending downward.

The pair of armrest brackets 13 and 14 is a member that rotatably supports the armrest equipped on the vehicle seat.

Figure 12:
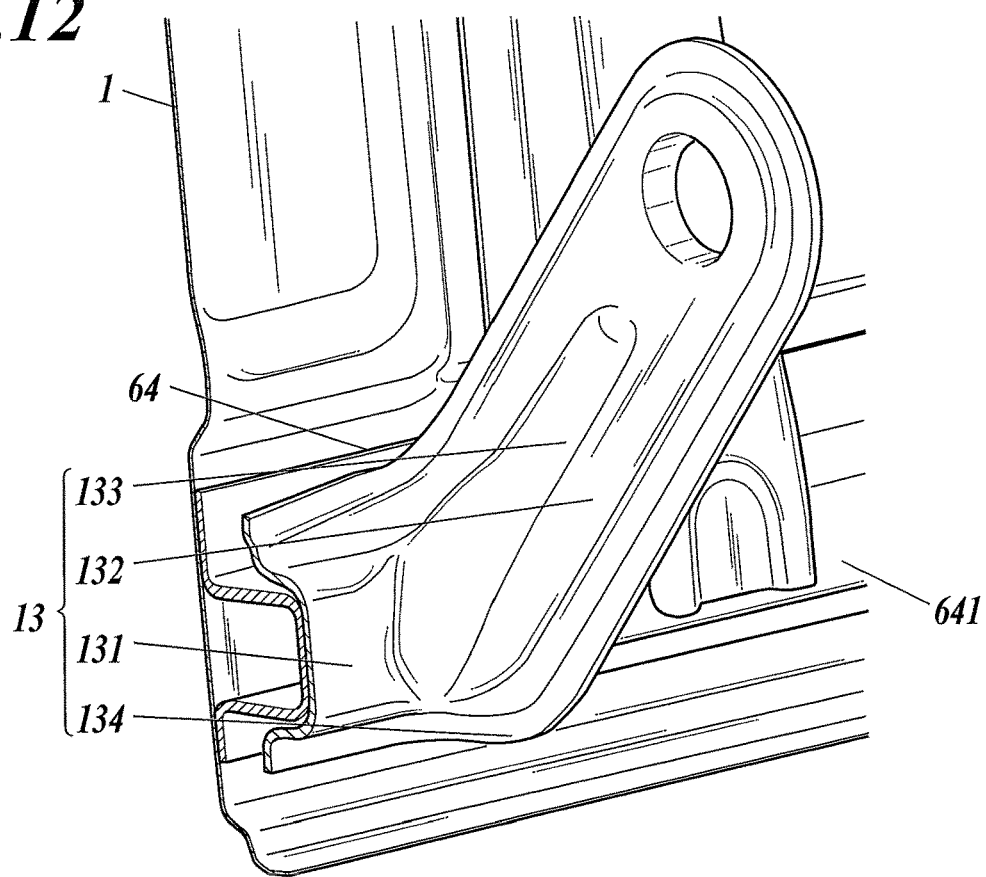
FIG. 12 This is a perspective view illustrating a portion of a left-side armrest bracket in a vertical section.
Figure 13:
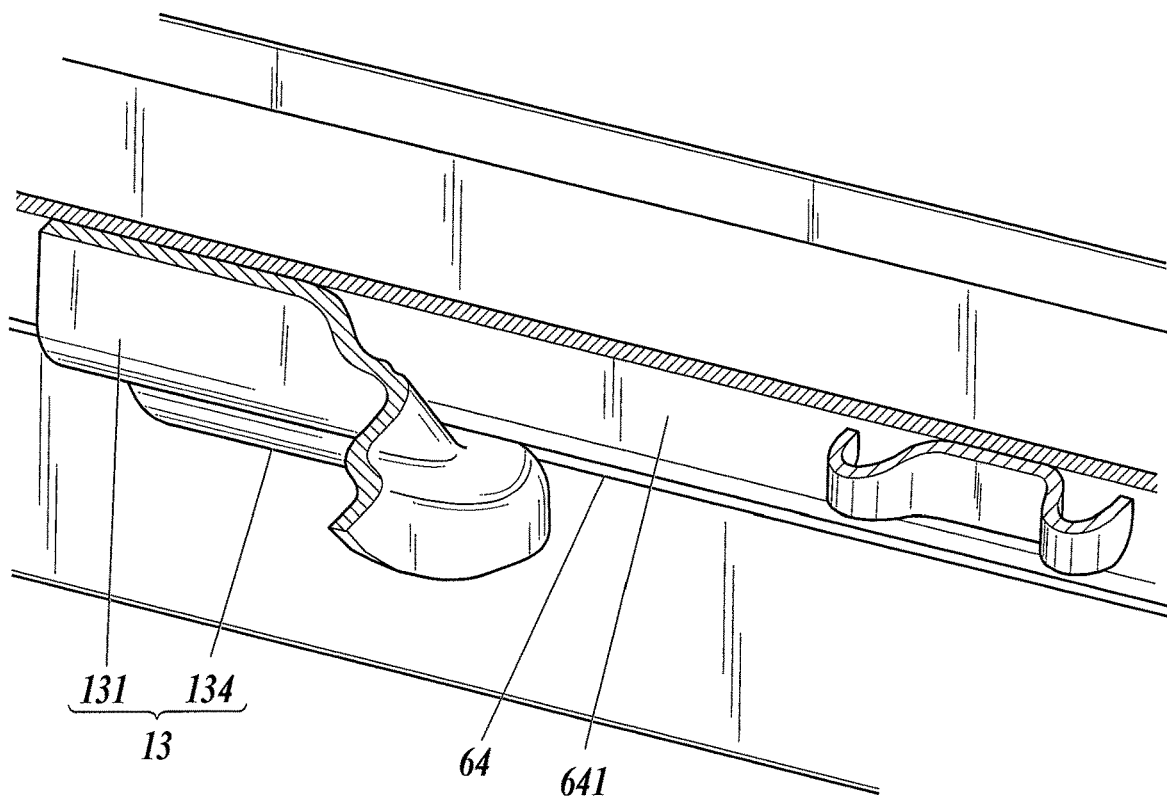
FIG. 13 This is a perspective view illustrating a portion of a left-side armrest bracket in a horizontal section.

FIG. 12 is a perspective view illustrating a portion of the left-side armrest bracket 13 in a vertical section. FIG. 13 is a perspective view illustrating a portion of the left-side armrest bracket 13 in a horizontal section.

The armrest bracket 13 includes a base end portion 131 joined to the front surface of the opposing wall 641 of the lower frame 64, a support arm 132 extending diagonally upward and forward from the base end portion 131, a bead 133 to reinforce the support arm 132, and a flange portion 134 formed along outer edges of the base end portion 131 and the support arm 132. These portions are formed from a single metal plate by pressing.

The base end portion 131 and the support arm 132 have side walls rising from the outer periphery thereof, and the above-described flange portion 134 protrudes outward at the tip end portion of the side wall.

In addition, the tip end portion of the support arm 132 includes a through hole formed to allow a support shaft that supports the armrest to pass through. Furthermore, the bead 133 bulging rightward from the end portion on the base end portion 131 side toward the extending end side is formed on the support arm 132. The rigidity of the armrest bracket 13 is enhanced by the side wall, the bead 133, and the flange portion 134, ensuring sufficient supporting strength of the armrest.

Moreover, the base end portion 131 is joined to the front surface of the opposing wall 641 of the lower frame 64 by laser welding. While joining the armrest bracket 13 would be difficult by the welding methods other than laser welding in a narrow region such as the opposing wall part 641 of the lower frame 64, the laser welding makes it possible to perform joining by laser emission from the rear. Therefore, the laser welding enables the armrest bracket 13 to be provided at a proper position with sufficient strength.

As illustrated in FIGS. 1 and 2, the right-side armrest bracket 14 includes a base end portion joined to the front surface of the opposing wall 621 of the middle frame 62, a support arm extending forward from the base end portion, and a flange portion formed along outer edges of the base end portion and the support arm. These portions are formed from a single metal plate by pressing.

Since the right-side armrest bracket 14 is joined to the middle frame 62, there is no need to extend the support arm unlike the case of the left-side armrest bracket 13, sufficient strength is obtained without providing the bead.

The base end portion of the armrest bracket 14 is also joined to the middle frame 62 by laser welding.

[Technical Effect of Embodiment of Invention]

As described above, the plurality of reinforcing structure sections surrounded by the beads bulging from the panel 1 into ridge shapes is formed in each of the regions A to C of the panel 1 of the skeletal structure 100.

By surrounding with beads along each of the up-down, left-right directions like the reinforcing structure sections 30A to 30D, 50A and 50B, the individual beads can increase the rigidity against the load from different directions, making it possible to suppress deformation of the panel 1 due to the load from more versatile directions. Moreover, since the beads having different directions are connected to each other uninterruptedly to surround each of the sections, it is possible to suppress the reduction in rigidity that might occur in separated portion caused by arranging the beads spaced apart from each other. This configuration makes it possible to reduce the deflection in a plurality of directions in the region surrounded by the beads.

Furthermore, since the plurality reinforcing structure sections surrounded by the beads is provided in each of the regions A to C, it is possible to receive the load applied to the skeletal structure 100 for each of the sections and suppress the overall deformation.

In addition, arranging the plurality of sections makes it possible to reduce the planar deflection and elastic deformation of the panel, leading to the reduction of the occurrence of abnormal noise due to return from the deformed state.

Moreover, the reinforcing structure sections 30A to 30D, 50A and 50B surrounded by the beads are further divided into subsections by the auxiliary beads, making it possible to further enhance the rigidity and distribute the stress, leading to further reduction of the deflection and elastic deformation.

The reinforcing structure sections 30A to 30D in particular include subsections divided into truss shapes such as a triangle shape by the auxiliary beads. The subsection having truss shape such as a triangle can decrease the number of portions having a long distance between the bead (or auxiliary bead) and the bead (or auxiliary bead) as compared with hexagonal reinforcing structure subsections, for example, a honeycomb structure. Accordingly, this makes it possible to further reduce deflection and elastic deformation within the subsection.

Moreover, the regions A and B have arrangements such as the reinforcing structure sections 30A and 30B, so as to allow the formation patterns of the auxiliary beads in the adjacent sections to be line-symmetrical about the boundary line as a center. For example, arranging sections having the same-shaped patterns in the same direction might cause weakness in each of the sections against the load from the same direction and might be likely to generate deflection in the same direction. In contrast, by arranging the auxiliary beads within the adjacent sections into line-symmetrical formation pattern, it is possible to avoid a likelihood of generation of deflection in the same direction since the directions of loads likely to generate deflection do not match section by section. Accordingly, it is possible to reduce deflection and elastic deformation against the load from more versatile directions.

Moreover, in each of the regions A to C, the plurality of reinforcing structure sections is arranged in the up-down direction to be formed on the panel 1, and additionally, the side frame 61 or the middle frame 62 joined to the panel 1 is arranged on both sides of each of the regions, along the up-down direction.

With this configuration, the deflection of the plurality of sections aligned in the up-down direction that might occur along the boundary line can be suppressed by the side frames 61 or the middle frame 62 on adjacent sides, making it possible to reduce the deflection and elastic deformation of the entire panel 1.

Furthermore, the upper end portion and the lower end portion of each of the side frame 61 and the middle frame 62 are respectively joined to the upper frame 63 and the lower frame 64 provided along the left-right direction. With this configuration, each of the side frame 61 and the middle frame 62 can maintain its orientation and position, making it possible to further reduce deflection and elastic deformation of the entire panel 1.

In the skeletal structure 100, the panel 1 and each of the frames 61 to 64 are joined to each other by laser welding at mutual joint surfaces of the panels 1 and the frames 61 to 64 by the solidified state after melting generated in the material for forming the panel 1 and the material for forming the frames 61 to 64. Accordingly, joining is achieved without adding a welding material other than the panel 1 and each of the frames 61 to 64, leading to the reduction of the weight of the skeletal structure 100 while maintaining high joining strength.

Moreover, since laser welding is performed as a method for manufacturing the skeletal structure, in which the panel 1 and each of the frames 61 to 64 are melted to be joined by solidification thereafter, it is possible to achieve welding in a range wider as compared with the case of conventional spot welding, or the like, leading to enhanced productivity.

Moreover, in the skeletal structure 100, each of the frames 61 to 64 of the frame 6 has an open cross-sectional shape and the end portions of the side frames 61 and the middle frames 62 are joined in a state of being overlapped with the upper frame 63 or the lower frame 64. This makes it easy to ensure a wide area of the joint, leading to the enhanced joining strength.

Moreover, the side frame 61 or the middle frame 62 of the skeletal structure 100 includes a notch at the upper end portion or the lower end portion, and the panel-side opposing surface of the opposing wall is joined to the upper frame 63 or the lower frame 64 arranged inside the notch. This configuration makes it possible to obtain the wider area of the joint so as to further enhance the joining strength.

Moreover, since the notch of the side frame 61 or the middle frame 62 has a gap with respect to the side wall of the upper frame 63 or the lower frame 64, it is possible to suppress the occurrence of abnormal noise due to sliding operation with the side wall. In addition, due to the presence of the gap, it is possible to allow processing errors, assembly errors, and thermal deformation of the side frame 61 or the middle frame 62.

Moreover, in the side frame 61 or the middle frame 62 of the skeletal structure 100, the opposing wall at the upper end portion or the lower end portion includes the irregular structure 625 having a protrusion at the center relative to the panel 1. This configuration can increase the rigidity of the irregular structure 625 against the load in the direction facing the opposing wall, leading to the enhanced strength at the joint between the frames.

In addition, in the side frame 61 or the middle frame 62 of the skeletal structure 100, the inclined surface 626 separated away from the panel 1 toward the tip end of the frame is formed in the opposing wall 621. With this configuration, it is possible to ensure a wide width of the side wall 622 on the end portion on which the notch 624 is formed, and possible to maintain the strength of the joining end portion of the side frame 61 or the middle frame 62 high.

Moreover, joining is performed in a state where the tip end portion of the flange portion of the side frame 61 or the middle frame 62 of the skeletal structure 100 overlaps with a portion of the flange portion of the upper frame 63 or the lower frame 64. This brings the side frame 61 or the middle frame 62 into a state of being joined with the upper frame 63 or the lower frame 64 by both the opposing wall and the flange portion, making it possible to further enhance the joining strength.

In addition, in the left and right side frames 61 and the left and right middle frames 62 of the skeletal structure 100, the non-joint portions n toward the panel 1 are arranged to overlap each other in the overlapping range j in the up-down direction. This makes it possible to control deformation to be generated in the overlapping range j in a case where the skeletal structure receives a collision load or a deformation load.

In particular, by arranging the overlapping range j to be lower than the central portion in the up-down direction of the panel, it is possible to generate deformation in a portion other than the central portion that is likely to develop a great amount of deformation at the time of occurrence of deformation, leading to reduction of the deformation amount.

Note that the overlapping range j is not limited to the side lower than the central portion and may be in the upper side as long as it is possible to suppress the occurrence of deformation in the central portion of the panel 1 that is likely to develop a great amount of deformation.

Moreover, the left and right side frames 61 and 61 of the skeletal structure 100 are arranged such that the non-joint portion n is closer to the central portion (upper) in the up-down direction than the non-joint portions n of the left and right middle frames 62 and 62. This leads to the state of the non-joint portions n of the frames 61, 61, 62 and 62 being arranged along the arc about the center of the panel as a center. Accordingly, even when a collision load or a deformation load is applied to the center of the panel, it is possible to generate deformation along the arc along which the non-joint portions n are arranged, and possible to guide the deformation position more effectively and to reduce the deformation amount.

Moreover, the overlapping range j of the non-joint portion n in the left and right side frames 61 and the left and right middle frames 62 of the skeletal structure 100 is defined as a range including one or more (for example, two) positions to be a boundary between the reinforcing structure sections arranged vertically in the panel 1, with respect to the up-down direction. This leads to a state that includes a boundary line between the mutual sections where deformation is likely to occur, making it possible to control the deformation position further effectively and reduce the deformation amount.

In addition, since the left and right side frames 61 of the skeletal structure 100 are coupled to the lower frame 64 using the set brackets 16A and 16B which are indispensable for attaching the projection nut 161 to the panel 1, it is possible to couple the left and right side frames 61 and 61 to the lower frame 64 without interfering with the projection nuts 161.

[Second Embodiment]

As a second embodiment, a skeletal structure 100F of a vehicle seat as another example will be described. The skeletal structure 100F of the vehicle seat will be described mainly in terms of differences from the skeletal structure 100 described above, and the same reference numerals as those of the skeletal structure 100 are used for the same configuration, and redundant description will be omitted.

In the following, while various technically preferable limitations for implementing the present invention are attached to the following embodiments, the scope of the present invention is not limited to the following embodiments and illustrative examples.

Figure 14:
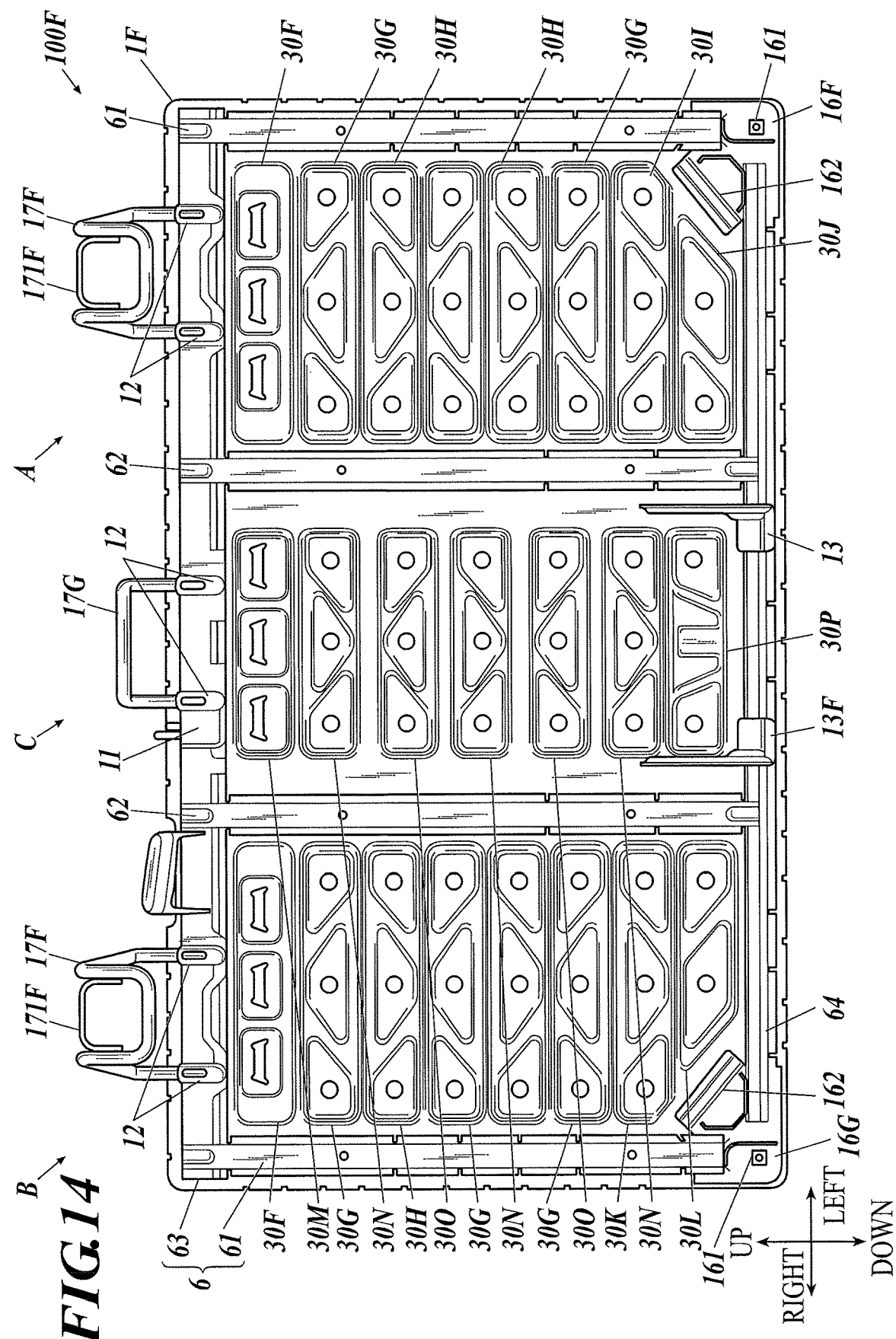
FIG. 14 This is a front view of a skeletal structure of a vehicle seat according to a second embodiment.
Figure 15:
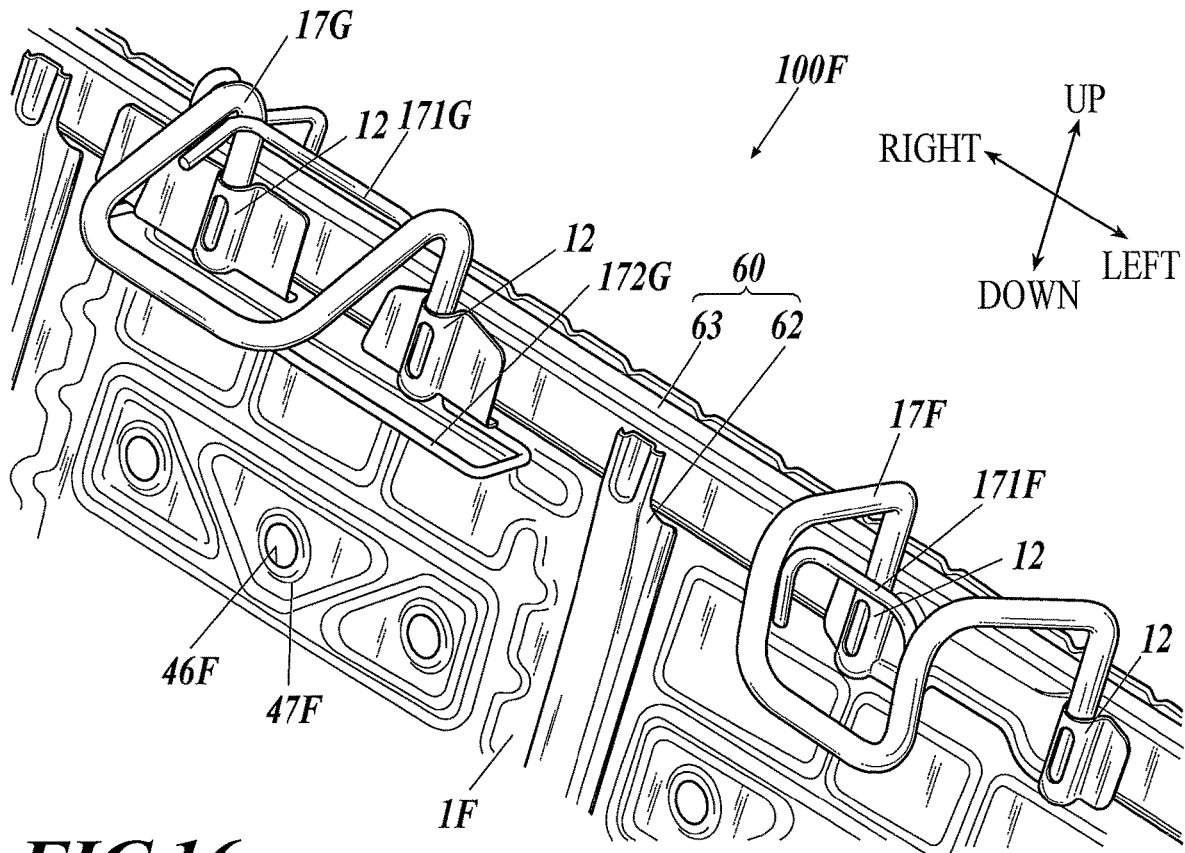
FIG. 15 This is an enlarged perspective view of an upper central portion of the skeletal structure of FIG. 14.
Figure 16:
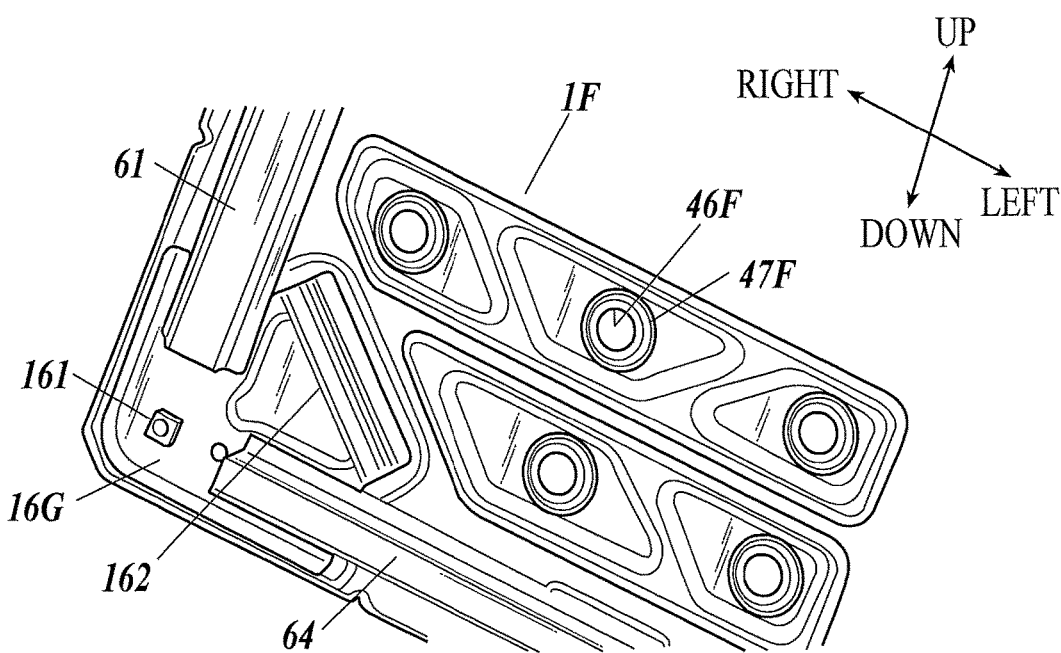
FIG. 16 This is an enlarged perspective view of a lower left portion of the skeletal structure of FIG. 14.

FIG. 14 is a front view of the skeletal structure 100F of the vehicle seat. FIG. 15 is an enlarged perspective view of an upper central portion of the skeletal structure 100F. FIG. 16 is an enlarged perspective view of a lower left portion thereof.

The skeletal structure 100F is attached to the vehicle in a same manner as the skeletal structure 100. Moreover, in a state where the skeletal structure 100F is mounted on the vehicle seat, the left side of the vehicle is defined as the left side of the skeletal structure 100F and the right side of the vehicle is defined as the right side of the skeletal structure 100F. In FIG. 14, the front side of the page is defined as the "front" and the back side of the page is defined as the "rear".

The skeletal structure 100F includes a panel 1F, the frame 6, the striker 11, the plurality of headrest support members 12, headrest pillars 17F and 17G, a pair of armrest brackets 13 and 13F.

Similarly to the panel 1, the panel 1F has a substantially rectangular shape and is a metal plate formed of steel, an aluminum alloy, or the like.

Similarly to the panel 1, the panel (pan frame) 1F is divided into three regions A to C by the left and right side frames 61 and 61 and the left and right middle frames 62 and 62.

The left region A of the panel 1 includes reinforcing structure sections 30F, 30G, 30H, 30G, 30H, 30G, 30I, 30J sequentially formed in order from the top.

The reinforcing structure section 30G includes a substantially rectangular bead surrounding the section 30G and two auxiliary beads dividing the section 30G surrounded by the bead into three subsections.

That is, the bead is a rectangle with a rounded corner.

The auxiliary bead is formed across the diagonal upper left and the diagonal lower left in the inner region of the bead.

This results in formation of an isosceles trapezoidal-shaped subsection at the center of the rectangular inner region of the bead, and bilaterally symmetrical formation of trapezoidal subsections each having unequal legs and two right-angled corners.

The reinforcing structure section 30H has a pattern shape being vertically inverted pattern shape of the section 30G. That is, the shape is a line-symmetrical pattern shape with respect to the section 30G about an axis along the left-right direction as a center.

The reinforcing structure section 30I has a pattern shape substantially equal to the section 30H except that the shape lacks a portion of the lower left portion in order to avoid interference with a set bracket 16F described below.

The reinforcing structure section 30F includes a substantially rectangular bead surrounding the section 30F and an auxiliary bead forming three rectangular subsections within the section 30F surrounded by the bead.

That is, the bead is a rectangle with a rounded corner similarly to the section 30G.

The auxiliary bead is a rounded rectangle smaller than the section 30G, and three auxiliary beads are formed in the left-right direction. In addition, each of the subsections includes a substantially trapezoidal opening.

The reinforcing structure section 30J includes a substantially trapezoidal bead surrounding the section 30J and an auxiliary bead dividing the section 30J surrounded by the bead into two subsections.

That is, the bead is formed in a trapezoidal shape with the corners rounded, having unequal legs and two right-angled corners at the right side. In addition, the left side of the bead is shaped to avoid interference with the set bracket 16F.

The auxiliary bead is formed diagonally over the upper left in the inner region of the bead.

This results in formation of a trapezoidal subsection having unequal legs and two right-angled corners on the right side of the inner region of the bead, and formation of a subsection of parallelogram on the left side of the inner region of the bead.

As illustrated in FIG. 14, the right region B of the panel 1F includes the reinforcing structure sections 30F, 30G, 30H, 30G, 30H, 30G, 30K, and 30L sequentially formed in order from the top.

This right region B has a horizontally inverted shape of the entire region A, that is, a line-symmetrical pattern shape with respect to each of the sections 30F to 30J of the region A about an axis along the up-down direction as a center. Therefore, a detailed description thereof will be omitted.

The central region C of the panel 1F includes reinforcing structure sections 30M, 30N, 30O, 30N, 30O, 30N, and 30P sequentially formed in order from the top.

The reinforcing structure section 30M is shaped substantially equally to the above-described section 30F, including a beads formation pattern generally reduced from the section 30F in the left-right direction.

The reinforcing structure section 30N is shaped substantially equally to the above-described section 30H, including a beads formation pattern generally reduced from the section 30H in the left-right direction.

The reinforcing structure section 30O is shaped substantially equally to the above-described section 30G, including a beads formation pattern generally reduced from the section 30G in the left-right direction.

The reinforcing structure section 30P includes a substantially rectangular bead surrounding the section 30P and two auxiliary beads further dividing the section 30P surrounded by the bead into three subsections.

That is, the bead is a rectangle with a rounded corner.

The auxiliary bead is formed across the diagonal upper left and the diagonal lower left in the inner region of the bead.

This results in formation of an isosceles trapezoidal-shaped subsection at the center of the rectangular inner region of the bead, and symmetrical formation of trapezoidal subsections each having unequal legs and two right-angled corners provided on the left and right sides. In addition, the isosceles trapezoidal-shaped subsection is shaped to include a downward recess in the central portion.

Each of all the reinforcing structure sections of each of the regions A to C includes a circular through hole 46F penetrating the panel 1F in the front-rear direction in each of the inner subsections, except for the sections 30F and 30M. In addition, a circular protrusion concentric with the through hole 46F and having a large diameter protrudes forward in the periphery of each of the through holes 46F. That is, weight reduction is aimed by forming the through hole 46F in almost all the sub-regions, higher rigidity is aimed by forming the irregular structure by protrusions, so as to suppress the strength reduction due to formation of the through holes 46F.

Moreover, a portion of the through holes 46F provided at specified positions (for example, any of the four corners of the panel 1F) is used for positioning the panel 1F with respect to a laser welding apparatus.

As illustrated in FIGS. 14 and 16, a right-side set bracket 16G is a metal plate having a substantially triangular shape in front view, and is joined to the lower right end portion of the front surface of the panel 1F by laser welding.

In this set bracket 16G, a projection nut 161 is fixedly mounted by projection welding onto the front surface of a right angle corner.

Moreover, in the set bracket 16G, the lower end portion of the flange portion of the right-side side frame 61 is joined to the upper portion of the right-angled corner by laser welding, and the right end portion of the flange portion of the lower frame 64 is joined to the left portion of the right-angled corner by laser welding. With this configuration, the set bracket 16G couples the lower end portion of the right-side side frame 61 and the right end portion of the lower frame 64.

The set bracket 16G includes a substantially triangular irregular structure protruding rearward formed in a region between the right-side side frame 61 and the lower frame 64, so as to enhance the rigidity.

Furthermore, the set bracket 16G includes an extension 162 extending from the substantially triangular irregular structure toward the center side of the panel 1F, and the tip end portion of the extension 162 is joined to the lower right portion of the front surface of the panel 1F by laser welding.

A reinforcing structure in a ridge shape that protrudes forward is formed along the diagonally lower left side in the vicinity of the tip end portion of the extension 162.

The shape and structure of the left-side set bracket 16F corresponds to a shape obtained by horizontally inverting the set bracket 16G. That is, since the left-side set bracket 16F has a shape and structure symmetrical with respect to the set bracket 16G about a plane along the up-down and front-rear directions as a center, the detailed description thereof will be omitted.

These set brackets 16F and 16G have rigidity equal to or higher than that of the set brackets 16A and 16B described above due to the reinforcing structure. Furthermore, the set brackets 16F and 16G are joined to the panel 1F by laser welding at the tip end of the extension 162, leading to enhanced mutual joining strength compared with the set brackets 16A and 16B.

The headrest pillar 17F is mounted on each of the support members 12 of the pair of headrests in the left region A and the right region B. The headrest pillar 17F is formed by bending a single thick metal wire material. Both end portions of the wire material are inserted from the upper end portion of the support member 12 of the pair of headrests so as to be joined by welding, and an intermediate portion of the wire material is folded frontward from the upper end portion of the panel 1F, further folded downward to be bent into a hook shape as a whole.

A reinforcing wire 171F is joined to the intermediate portion of the wire material of the headrest pillar 17F, that is, the portion corresponding to the tip end of the hook bent downward by welding so as to be arranged across the wire materials.

Moreover, the headrest pillar 17G is mounted on the pair of headrest support members 12 in the central region C. The headrest pillar 17G is obtained by bending a single thick metal wire material. Both end portions of the wire material are inserted from the upper end portion of the support member 12 of the pair of headrests to be joined by welding, and an intermediate portion of the wire material is folded frontward from the upper end portion of the panel 1F, further folded diagonally downward to be bent into a gentle angled hook shape as a whole by the headrest pillar 17F.

A reinforcing wire 171G is also joined to the intermediate portion of the wire material of the headrest pillar 17G by welding.

In addition, a backboard engaging wire 172G formed of a wire material bent into a rectangular frame shape is fixedly mounted onto the front surface of the panel 1F by welding under the headrest pillar 17G.

A plate-like backboard is arranged on the front surface side of the central region C of the panel 1F when the skeletal structure 100F is attached to the rear seat, and the upper end portion of the backboard is inserted into a backboard engaging wire 172G. The upper end portion of the backboard includes a claw extending forward.

In a case where a collision from the rear, etc. occurs and this applies a forward load or stress to the lower center portion of the skeletal structure 100F to be deformed forward, the backboard is also pushed forward. In this case, however, the claw at the upper end portion is caught by the backboard engaging wire 172G to prevent extrusion, making it possible to suppress forward deformation of the skeletal structure 100F.

The pair of armrest brackets 13 and 13F is fixedly mounted onto the lower frame 64 by laser welding.

In this skeletal structure 100F, the armrest bracket 13F is provided instead of the right-side armrest bracket 14 described above.

The armrest bracket 13F has a shape obtained by horizontally inverting the armrest bracket 13. That is, since the armrest bracket 13F has a shape and structure which is plane-symmetrical with respect to the armrest bracket 13 about a plane along the up-down and front-rear directions, the detailed description thereof will be omitted.

The skeletal structure 100F is applicable to obtain the same technical effect as the skeletal structure 100 described above and additionally has excellent enhancement such as enhanced productivity by simplified patterns of the reinforcing structure beads in the panel 1F, the weight reduction due to the through holes 46F formed in each of the reinforcing structure sub-regions, and enhanced rigidity due to the use of the headrest pillars 17F and 17G, the pair of armrest brackets 13 and 13F, and the set brackets 16F and 16G.

[Others]

The layout of the plurality of regions including the reinforcing structure sections of the panels 1 and 1F is not limited to that illustrated in FIG. 1 or FIG. 14. For example, each of the regions may be decreased or increased.

In addition, in the case of using the skeletal structures 100 and 100F for the backrest of the rear seat, there may be a case of adopting a structure capable of inserting luggage from a rear-side loading platform by opening the central portion of the backrest.

In order to manage this, it is also allowable to change the entire reinforcing structure formation zone in the region B in the skeletal structures 100 and 100F into a wide opening portion.

Moreover, while the side frame 61, the middle frame 62, the upper frame 63, and the lower frame 64 constituting the frame 6 are all provided with flange portions, it is also allowable to adopt a configuration in which the panel-side end surface of the side wall is used for joining without providing the flange portions.

INDUSTRIAL APPLICABILITY

The present invention is applicable in the field of a skeletal structure that joins a frame and a panel.

EXPLANATION OF REFERENCE NUMERALS 1, 1F panel
6 frame
11 striker
12 support member
13, 13F, 14 armrest bracket
16A, 16B, 16F, 16G set bracket
21, 22 recess
30A to 30P, 50A, 50B reinforcing structure section
31 to 34 bead
35 to 39 auxiliary bead
41 to 45 subsection
46 to 49, 46F through hole
61 side frame (first frame)
62 middle frame (first frame)
63 upper frame (second frame)
64 lower frame (second frame)
100, 100F skeletal structure
131 base end portion
132 support arm
133 bead
134 flange portion
161 projection nut
613, 623 flange portion
621 opposing wall
622 side wall
623 flange portion
624 notch
625 irregular structure
626 inclined surface
631 opposing wall
632 side wall
633 flange portion
641 opposing wall
A left region
B right region
C central region
j overlapping range
n non-joint portion
s joint portion

The invention claimed is:

1. A skeletal structure comprising:
a panel; and
a frame which is joined to a front surface side of the panel, wherein
the frame includes a plurality of first frames oriented in a fixed direction and a second frame oriented in a direction orthogonal to each of the first frames,
each of the first frames and the second frame are formed to have an open cross-sectional shape,
each of the first frames and the second frame includes an opposing wall facing the panel and a pair of side walls rising from both side portions of the opposing wall toward the panel,
the plurality of first frames includes joint portions and non-joint portions to the panel along a longitudinal direction of the first frames, and
the non-joint portions of all the first frames are arranged at positions matching or overlapping with each other with respect to the longitudinal direction of the first frames.

2. The skeletal structure according to claim 1, wherein the non-joint portions of all the first frames are present on one side with respect to a central portion in the longitudinal direction of the first frames.

3. The skeletal structure according to claim 2, wherein a plurality of reinforcing structure sections surrounded by a bead bulging into a ridge shape is formed on the panel.

4. The skeletal structure according to claim 3, wherein the first frames and the second frame located at a corner of the panel are coupled with each other via a set bracket, which is a plate, equipped with a projection nut.

5. The skeletal structure according to claim 2, wherein the first frames and the second frame located at a corner of the panel are coupled with each other via a set bracket, which is a plate, equipped with a projection nut.

6. The skeletal structure according to claim 2, wherein the panel and the frame are joined to each other on mutual joint surfaces by a solidified state after melting generated in the panel and the frame.

7. The skeletal structure according to claim 2, wherein an end portion of each of the first frames is joined to the second frame in an overlapping state.

8. The skeletal structure according to claim 2, wherein the non-joint portions of the first frames at both end portions in an arrangement direction of the plurality of first frames are present at positions closer to the central portion in the longitudinal direction of the first frames with respect to one non-joint portion of the non-joint portions of one first frame of the first frames at a central portion in the arrangement direction.

9. The skeletal structure according to claim 8, wherein a plurality of reinforcing structure sections surrounded by a bead bulging into a ridge shape is formed on the panel.

10. The skeletal structure according to claim 9, wherein the first frames and the second frame located at a corner of the panel are coupled with each other via a set bracket, which is a plate, equipped with a projection nut.

11. The skeletal structure according to claim 8, wherein the first frames and the second frame located at a corner of the panel are coupled with each other via a set bracket, which is a plate, equipped with a projection nut.

12. The skeletal structure according to claim 8, wherein the panel and the frame are joined to each other on mutual joint surfaces by a solidified state after melting generated in the panel and the frame.

13. The skeletal structure according to claim 8, wherein an end portion of each of the first frames is joined to the second frame in an overlapping state.

14. The skeletal structure according to claim 1, wherein a plurality of reinforcing structure sections surrounded by a bead bulging into a ridge shape is formed on the panel.

15. The skeletal structure according to claim 14, wherein the plurality of reinforcing structure sections is formed along the longitudinal direction of the first frames, and one non-joint portion of the non-joint portions of one first frame of the first frames is present in a range including one or more boundaries between the reinforcing structure sections in the longitudinal direction of the first frames.

16. The skeletal structure according to claim 15, wherein the first frames and the second frame located at a corner of the panel are coupled with each other via a set bracket, which is a plate, equipped with a projection nut.

17. The skeletal structure according to claim 14, wherein the first frames and the second frame located at a corner of the panel are coupled with each other via a set bracket, which is a plate, equipped with a projection nut.

18. The skeletal structure according to claim 1, wherein the first frames and the second frame located at a corner of the panel are coupled with each other via a set bracket, which is a plate, equipped with a projection nut.

19. The skeletal structure according to claim 1, wherein the panel and the frame are joined to each other on mutual joint surfaces by a solidified state after melting generated in the panel and the frame.

20. The skeletal structure according to claim 1, wherein an end portion of each of the first frames is joined to the second frame in an overlapping state.

* * * * *